United States Patent [19]

Horiguchi et al.

[11] Patent Number: 4,561,103
[45] Date of Patent: Dec. 24, 1985

[54] PRINT INSPECTING METHOD AND APPARATUS

[75] Inventors: Satoru Horiguchi, Saitama; Hiroshi Harima, Yokosuka, both of Japan

[73] Assignee: Dai Nippon Insatsu Kabushiki Kaisha, Tokyo, Japan

[21] Appl. No.: 483,956

[22] PCT Filed: Jul. 23, 1982

[86] PCT No.: PCT/JP82/00285

§ 371 Date: Mar. 22, 1983

§ 102(e) Date: Mar. 22, 1983

[87] PCT Pub. No.: WO83/00557

PCT Pub. Date: Feb. 17, 1983

[30] Foreign Application Priority Data

| Jul. 29, 1981 | [JP] | Japan | 56-118893 |
| Sep. 18, 1981 | [JP] | Japan | 56-146355 |
| Nov. 11, 1981 | [JP] | Japan | 56-179599 |
| Apr. 17, 1982 | [JP] | Japan | 57-63221 |

[51] Int. Cl.⁴ .......... G06K 9/00; G06K 5/00
[52] U.S. Cl. .......... 382/1; 356/71; 356/394; 358/106; 364/551; 382/34; 382/45
[58] Field of Search .......... 356/71-73, 356/389, 390, 394, 398, 443-444; 250/559, 571-572; 354/354; 355/40; 382/34, 41, 45, 54, 57, 1; 358/93, 106-107; 364/551-552, 518, 523

[56] References Cited

U.S. PATENT DOCUMENTS

| 3,645,626 | 2/1972 | Druschel | 356/71 |
| 3,710,323 | 1/1973 | Andrews et al. | 382/45 |
| 3,883,737 | 5/1975 | Throssell et al. | 382/41 |
| 4,197,584 | 4/1980 | Blazek | 356/394 |
| 4,319,270 | 3/1982 | Kimura et al. | 358/106 |

FOREIGN PATENT DOCUMENTS

| 44-20434 | 9/1969 | Japan . |
| 50-151587 | 12/1975 | Japan . |
| 52-74409 | 6/1977 | Japan . |
| 55-94147 | 7/1980 | Japan . |

OTHER PUBLICATIONS

Crawford, "Pictorial Information Disector and Analyzer System (PIDAS)", *IBM Tech. Disclosure Bulletin*, vol. 15, No. 1, Jun. 1972, pp. 61-62.

*Primary Examiner*—Leo H. Boudreau
*Attorney, Agent, or Firm*—Koda and Androlia

[57] ABSTRACT

This invention relates to a technique for inspecting picture patterns on prints which are being run in a rotary press or the like, and more particularly to a method in which reference data read out of a reference print is written in a memory, and inspection data read out of a print under inspection is compared with the reference data for every picture element for instance to determine whether or not the print is acceptable, and an apparatus for practicing the method. The specific feature of the invention resides in that (1) in reading the above-described data a print running speed or the position of a picture pattern in the direction of width is detected to rewrite the reference data, (2) in data comparison, the comparison level is optionally set up, and (3) the data comparison is carried out not only for every picture element, but also for the sum of picture elements over the entire picture pattern and for the sum of picture elements arranged linearly in the print running direction.

7 Claims, 43 Drawing Figures m PARTS →

| A11 | A21 | A31 | — — — — — — — — — — — | Am1 |
|-----|-----|-----|-----------------------|-----|
| A12 | A22 | A32 | — — — — — — — — — — — | Am2 |
|  |  |  | Aij |  |
| A1n | A2n | A3n | — — — — — — — — — — — | Amn | n PARTS ↓

$(\sum_{i=1}^{m}\sum_{j=1}^{n} SD_{ij})$  $(\sum_{i=1}^{m}\sum_{j=1}^{n} ID_{ij})$ (a)

(b)

(A)

(B)

(A)

(B)

$\Delta X = \Delta Y$

PRINT INSPECTING METHOD AND APPARATUS

DESCRIPTION

1. Technical Field

This invention relates to a method of accurately inspecting prints which are being run in a rotary press or the like, in order to determine whether or not the prints are acceptable, and to an apparatus for practicing the method.

2. Background Art

In general, prints must be finished to a considerably high degree. Accordingly, an inspecting method sufficiently high in reliablity must be employed in inspecting such prints.

In a rotary press or the like, prints are being run at high speed. Accordingly, if a visual inspection method is employed, it is impossible to inspect the prints in real time.

In order to overcome the difficulty, an inspecting method has been proposed in which the picture pattern of a print being run is detected by a one-dimensional image sensor camera or the like to provide video signals, and the video signals thus provided, being handled as analog data, are compared with the reference voltage to determine whether or not the print is acceptable, or binary-coded with a predetermined threshold value thereby to determine the acceptability of the print.

The above-described method utilizing the analog video signals may detect defects on a blank roll stock with high accuracy; however, it is disadvantageous in that, in the case where the density varies widely as in the case of the picture pattern on a print, the accuracy for determining whether or not the print is acceptable is not sufficient.

In order to overcome this drawback, a method has been proposed in which the video signals are digitalized so that the video signals of the entire picture pattern of a print under inspection can be stored, video signals obtained from a reference print are stored as reference data, and video signals obtained from a print under inspection are employed as inspection data, so that the inspection data is compared with the reference data which is read out for every picture element, to determine whether or not the print is acceptable.

The method is much higher in inspection accuracy than the visual inspection method or the analog inspection method.

An object of this invention is to improve a conventional print inspection apparatus of digitalization type, thereby to provide a print inspecting apparatus in which the accuracy is much higher, an effective masking function is readily provided, and the operation is stable even when the state of prints is changed.

DISCLOSURE OF THE INVENTION

The specific feature of the invention resides in that image data read out of a reference print is written in a memory while image data read out of a print under inspection is employed as inspection data, and when the inspection data is compared with the reference data, for instance, for every picture element to determine whether or not the print is acceptable, the reference data is rewritten by detecting not only the image data but also the print running speed or the position of the picture pattern in the direction of width.

The specific feature of the invention resides further in that, in comparing the detection data with the reference data for every picture element for instance, the comparison level is optionally set up for every picture element.

The specific feature of the invention resides further in that the data comparison is carred out not only for every picture element, but also for the sum of picture elements over the entire picture pattern and for the sum of picture elements arranged linearly in the print running direction, and the results of comparison are generally judged to determine whether or not the print is acceptable.

Figure 41:
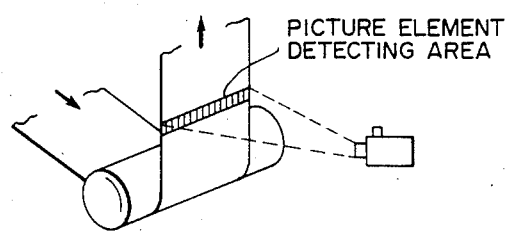
Figure 41:
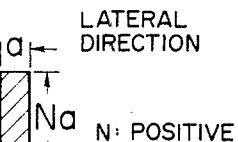

The parts (A) and (B) of FIG. 41 are explanatory diagrams showing the configuration of a picture element in a detection area.

Figure 42:
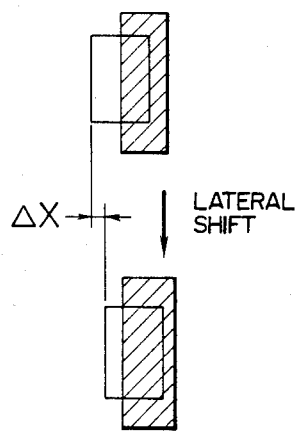
Figure 42:
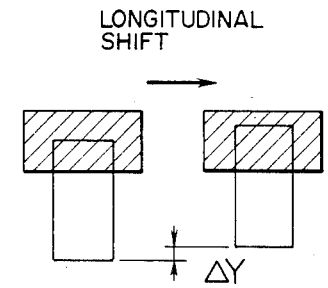

The parts (A) and (B) of FIG. 42 are explanatory diagrams showing the difference in position shift detection sensitivity in two directions.

Figure 43:
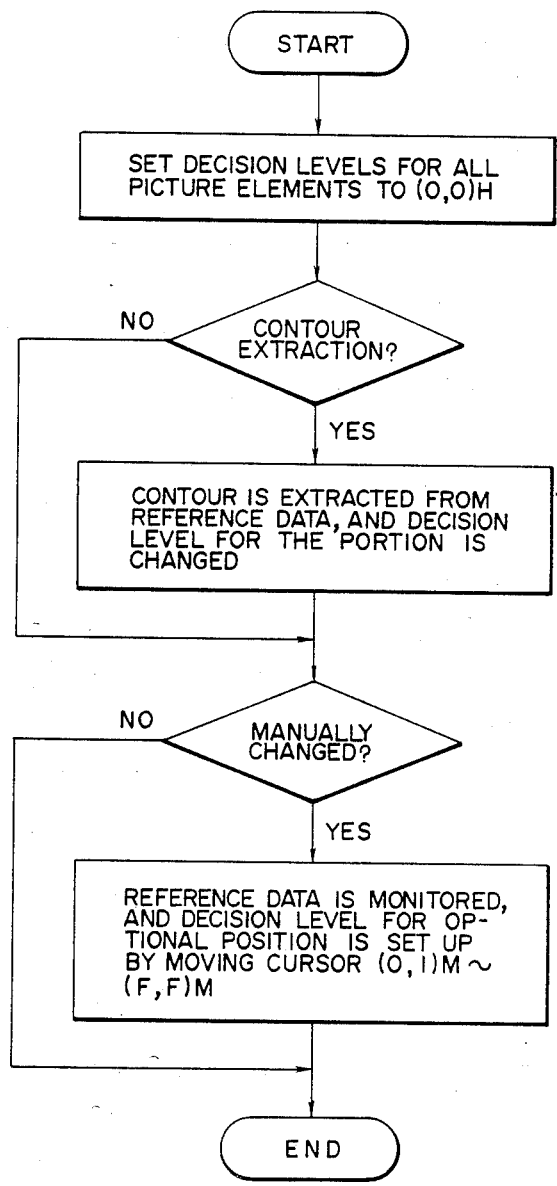

FIG. 43 is a flow chart showing one example of a data setting operation.

BEST MODE FOR CARRYING OUT THE INVENTION

Prior to this invention, a conventional digital type inspecting method will be described with reference to FIGS. 1 and 2, and thereafter one embodiment of the invention will be described with reference to FIGS. 3 through 43.

Figure 1:
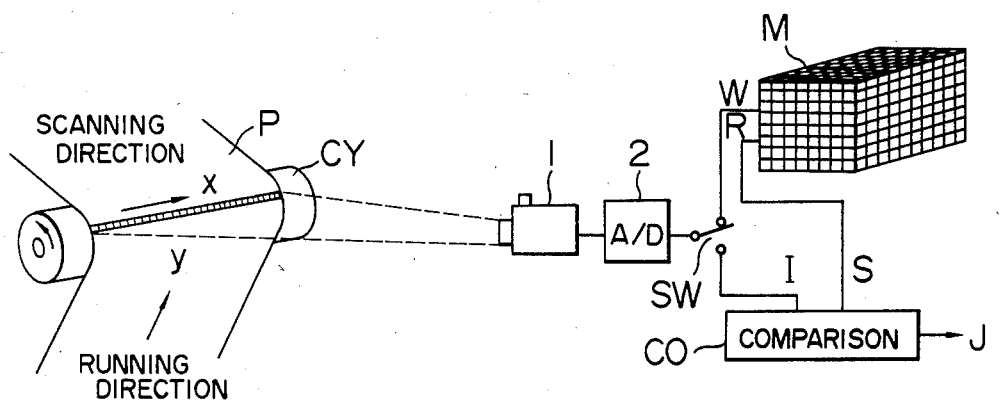
FIG. 1 is an explanatory diagram showing theoretically one example of a print inspecting method according to a digitalization system.

FIG. 1 shows the principle of one example of the conventional digital type inspecting method. In FIG. 1, reference character P designates a print; CY, a printing cylinder; 1, an image sensor camera; 2, an analog-to-digital (A/D) converter; SW, a change-over switch; M, a reference data memory; and CO, a comparator.

The print P is a long sheet or film on which a predetermined picture pattern is repeatedly printed by a rotary press in the direction of run of the print. The print P is run by the printing cylinder CY.

The image sensor camera (hereinafter referred to an "IS camera", when applicable) 1 shoots the surface of the print 1 on which the picture pattern is printed; that is, the IS camera 1 scans one-dimensionally a predetermined portion thereof in a widthwise direction X perpendicular to the direction of run Y of the print paper, to provide a video signal. The one-dimensional video signal is digitalized by the A/D converter for every number of picture elements, and is then applied to the change-over switch.

Figure 2:
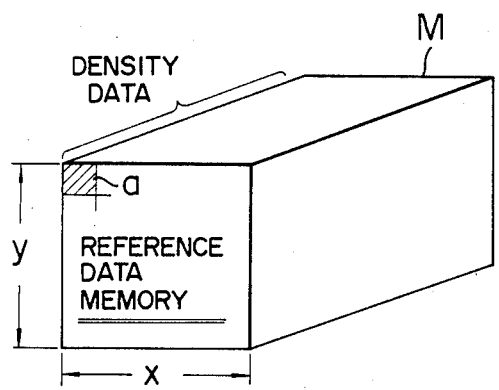
FIG. 2 is an explanatory diagram outlining a reference data memory.

The memory contents of the reference data memory M is as shown in FIG. 2. That is, the reference data memory M is so designed that the digitalized density data of picture elements can be written in and read out of addresses a which are arranged in the print width direction and in the print run direction. When the armature of the change-over switch SW is tripped as shown in FIG. 1 and the IS camera shoots a predetermined picture pattern portion of the print P, the density data of the picture elements of a portion of the print in the direction of width X are successively written in addresses arranged in the print width direction. This operation is repeatedly carred out as the print P is run in the direction Y, so that the density data are written in the addresses arranged in the direction of run. Finally, the image data, in a predetermined range, of the picture pattern on the print P are written in the reference data memory M.

When the armature of the change-over switch SW is tripped downwardly, image data successively read out of a predetermined range of the picture pattern on the print P are applied, as inspection data I to the comparison circuit CO, and reference data S read out of the reference data memory M for picture elements in correspondence thereto are applied to the comparison circuit CO. The result of comparison is provided, as an output J, by the comparison circuit CO.

Accordingly, at a predetermined time instant immediately after the printing operation has been started, the armature of the switch SW is tripped to the reference data memory M after confirming that the print's picture pattern is free from defects, so that image data obtained from the print P at that time are written in the reference data memory M. Thereafter, if the armature of the switch S is tripped over to the comparison circuit CO, then the image data successively read out of the print P are inputted, as the inspection data I, to the comparison circuit CO. Therefore, in the comparison circuit CO, the image data thus inputted are compared with the reference data S which are read out of the reference data memory M, successively for every picture element. The result of comparison is provided as the output J.

Thus, if the output J of the comparison circuit CO is detected so as to detect whether or not the reference data S coincides with the inspection data I, then it can be continuously determined whether or not the print P running at high speed is satisfactory during printing. This inspection method is much higher in reliability than a visual inspection method.

Figure 3:
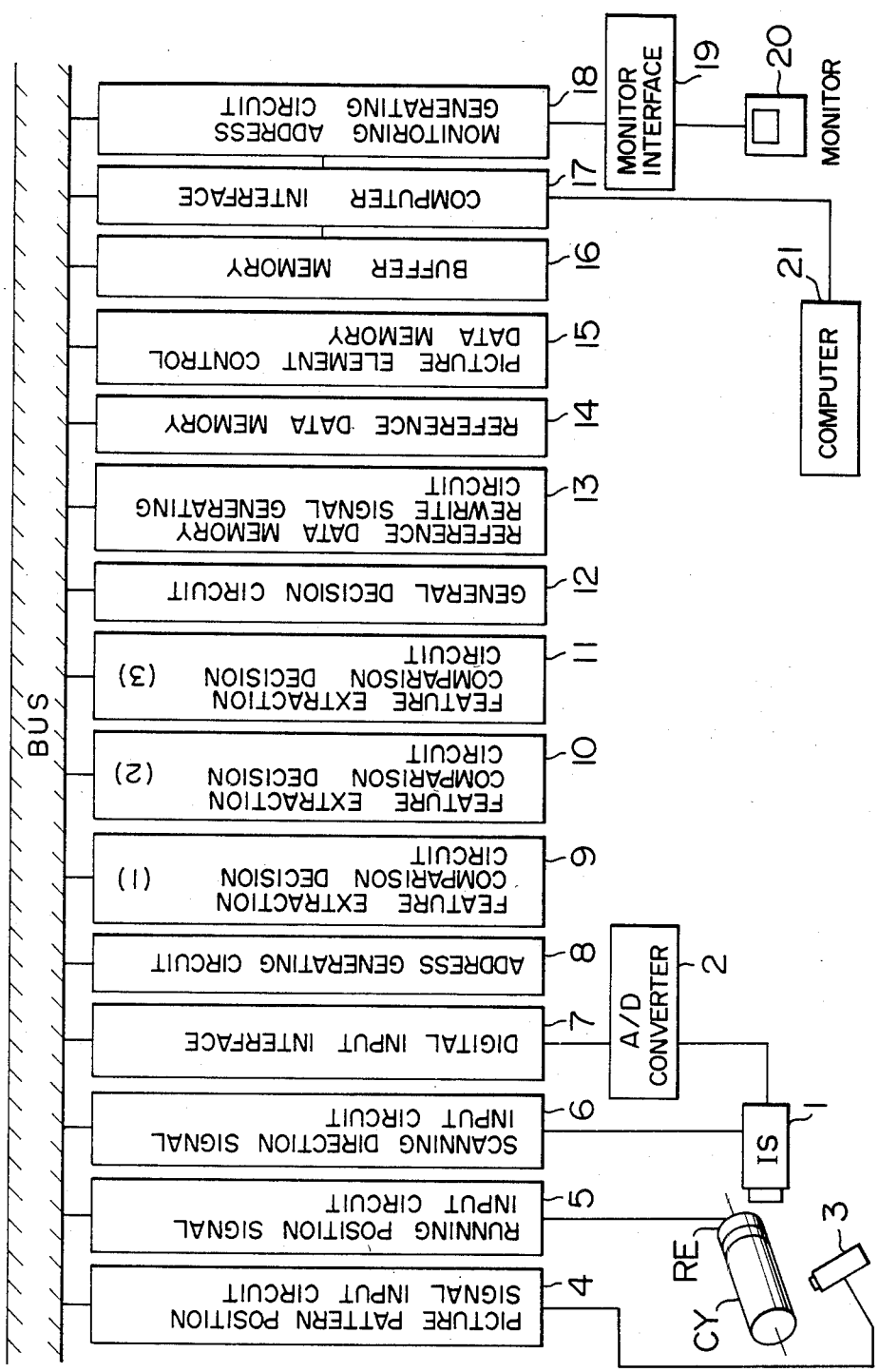
FIG. 3 is a block diagram showing the entire arrangement of one example of a print inspecting apparatus according to this invention.

FIG. 3 is a block diagram showing the entire arrangement of one embodiment of the invention. In FIG. 3, a printing cylinder CY, an IS camera 1 and an A/D converter are similar to those in FIG. 1. Further in FIG. 3, reference numeral 3 designates a picture pattern position detector; 4, a picture pattern position signal input circuit; 5, a running position signal input circuit; 6, a scanning direction signal input circuit; 7, a digital input interface; 8, an address generating circuit; 9, a first feature extraction comparison decision circuit; 10, a second feature extraction comparison decision circuit; 11, a third feature extraction comparison decision circuit; 12, a general decision circuit; 13, a reference data memory rewrite signal generating circuit; 14, a reference data memory (corresponding to the memory M in FIG. 1); 15, a picture element control data memory; 16, a buffer memory; 17, a computer interface; 18, a monitoring address generating circuit; 19, a monitor interface; 20, a monitor; and 21, a computer, these circuit elements being connected through a bus.

As was described before, in such an inspecting system, it is necessary that inspection data from a picture pattern repeatedly printed are compared with the reference data for every picture element, and accordingly it is essential to determine addresses definitely representing the picture surface of the picture pattern. For this purpose, a rotary encoder RE is employed to detect the position in rotational direction of the printing cylinder CY which is necessary for addressing, and the output signal of the rotary encoder RE is applied to the running position signal input circuit 5, so that the latter 5 provides signals representing the inspection starting point and the inspection ending point on the circumference of the printing cylinder CY.

Figure 4:
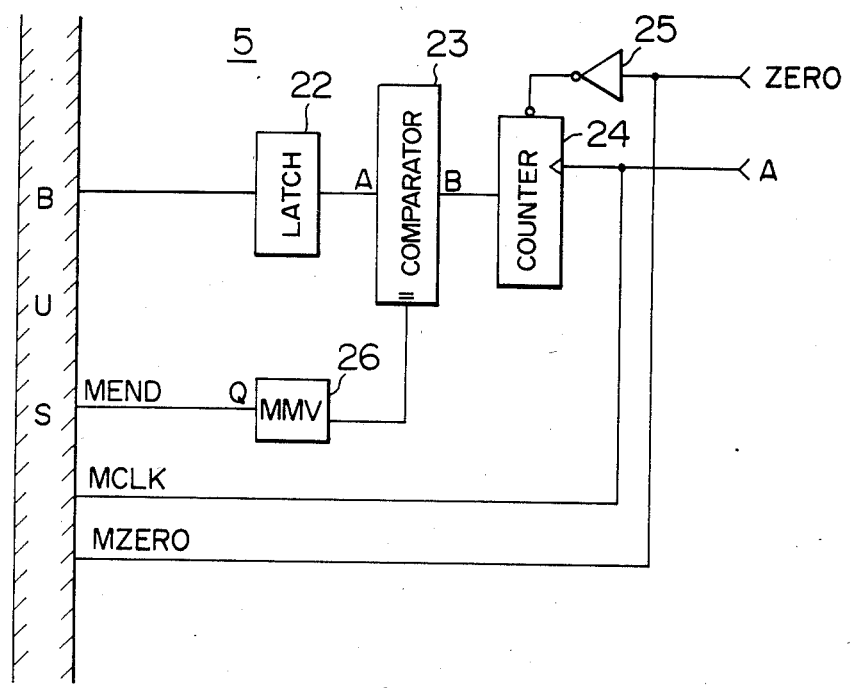
FIG. 4 is a circuit diagram showing one example of a running postion signal input circuit.

One example of the running position signal input circuit 5 is as shown in FIG. 4. The rotary encoder RE outputs two kinds of signals; the first one is a signal ZERO in the form of one pulse which is produced at a predetermined rotational position of the printing cylinder CY whenever the latter CY makes one revolution, and the second one is an A-phase signal in the form of a predetermined number of pulses which are outputted every revolution. Before the inspection is started, a set value is applied from the computer 21 through the computer interface 17 to a latch circuit 22, where it is written, as a result of which a signal MEND representing the inspection ending point can be produced.

Similarly as in the above-described case, set values are written in the latch circuits of the following circuits by means of the computer 21.

After being reset by the signal ZERO, the counter 24 counts the A-phase signal. The output of the counter 24 is applied to a comparator 23, where it is compared with the set value of the latch circuit 22. When both coincide with each other, the comparator 23 provides an output, which is supplied to a monostable multivibrator 26 (hereinafter referred to merely as "an MMV 26", when applicable) to trigger the latter 26, to cause the same 26 to provide the signal. Thus, the inspection ending point has been set up. On the other hand, the inspection starting point is represented by the signal ZERO, which, in this case, is referred to as "a signal MZERO". Thus, the inspection period is between the occurrences of the signals MZERO and MEND. The A-phase signal of the rotary encoder RE is supplied to the bus as it is, so as to be employed as a clock signal in other circuits, thus being referred to as "a signal MCLK" in this case.

In order to detect positions in the direction of width of a print (hereinafter referred to as "a print width direction", when applicable) for addressing, a self-running IS camera (such as a CCD camera or a MOS camera) is employed, and its output signal is utilized.

Figure 5:
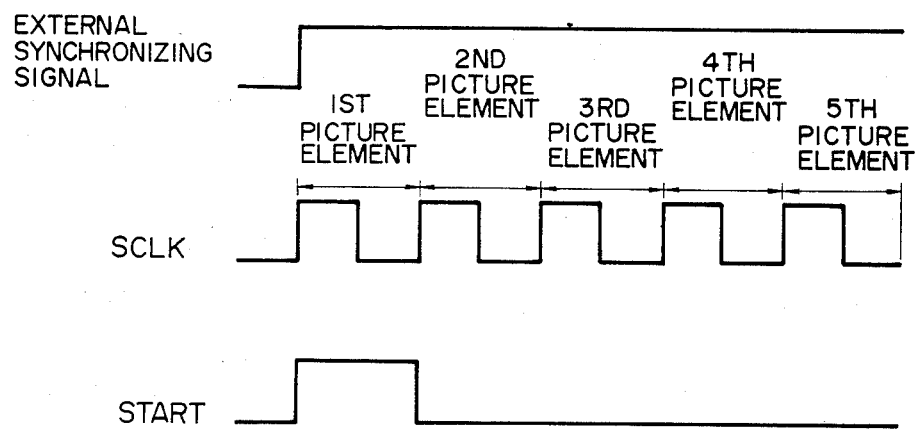
FIG. 5 is a time chart for a description of the operation.

The scanning operation of the IS camera 1 is controlled by an external synchronizing signal as shown in FIG. 5; that is, the line scanning is repeatedly carried out at predetermined scanning intervals only when the external synchronizing signal is raised to a logical high level (hereinafter referred to merely as "H" or "1", when applicable). The IS camera 1 provides a signal START at the start of scanning and a signal SCLK in synchronization with the scanning, as shown in FIG. 5.

Figure 6:
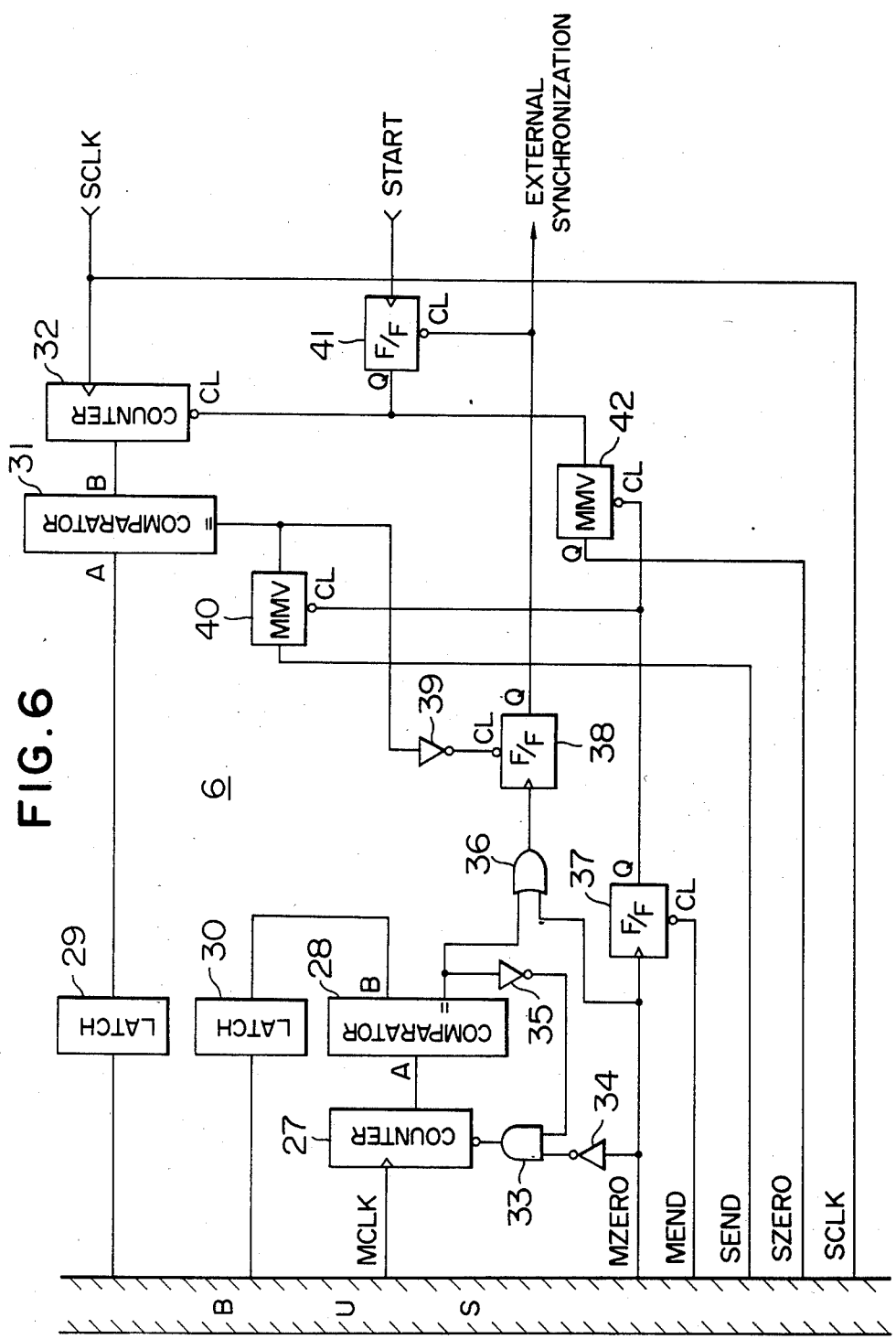
FIG. 6 is a circuit diagram showing one example of a scanning direction signal input circuit.

The scanning direction signal input circuit 6 is to control the above-described three signals, namely, the external synchronizing signal, the signal START and the signal SCLK. One example of the circuit 6 is as shown in FIG. 6.

In response to the signal MZERO signal from the running position signal input circuit 5, the scanning direction signal input circuit 6 provides the external synchronizing signal to start the scanning of the IS camera 1 (hereinafter referred to merely as "an IS 1", when applicable). Next, in order to repeat the scanning at the same intervals in the direction of rotation of the printing cylinder CY, the signal MCLK is counted by a counter 27 and is compared with the number of division in the direction of rotation of the printing cylinder CY in a comparator 28, which has been set in a latch circuit 30. When the count value reaches the set value, the comparator 28 outputs the external synchronizing signal. This is repeatedly carried out during a period of time corresponding to one inspection picture.

On the other hand, upon start of the scanning of the IS 1, the circuit receives the signal SCLK and the signal START from the IS 1. The signal SCLK is counted by a counter 32. When the count value reaches the number of division in the direction of scanning which has been set in a latch circuit 29, a comparator 31 outputs a signal SEND. Control is so made with the aid of a D type flip-flop 37 and the signals MZERO and MEND that the signals SZERO and SEND are produced during the inspection period only.

Figures 7, 8:
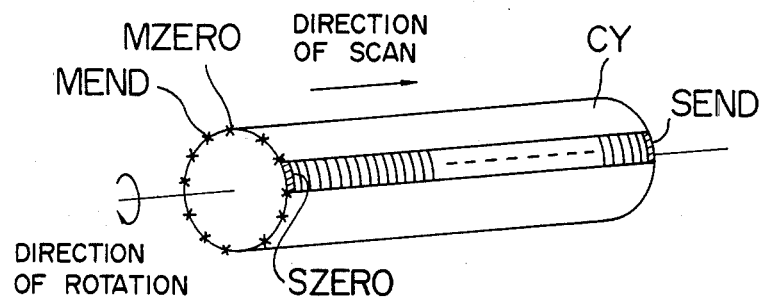
FIG. 7 is an explanatory diagram showing the relationships between the inspection surface of a printing cylinder and various signals.
FIG. 8 is an explanatory diagram showing the addresses on the inspection surface.
Figure 9:
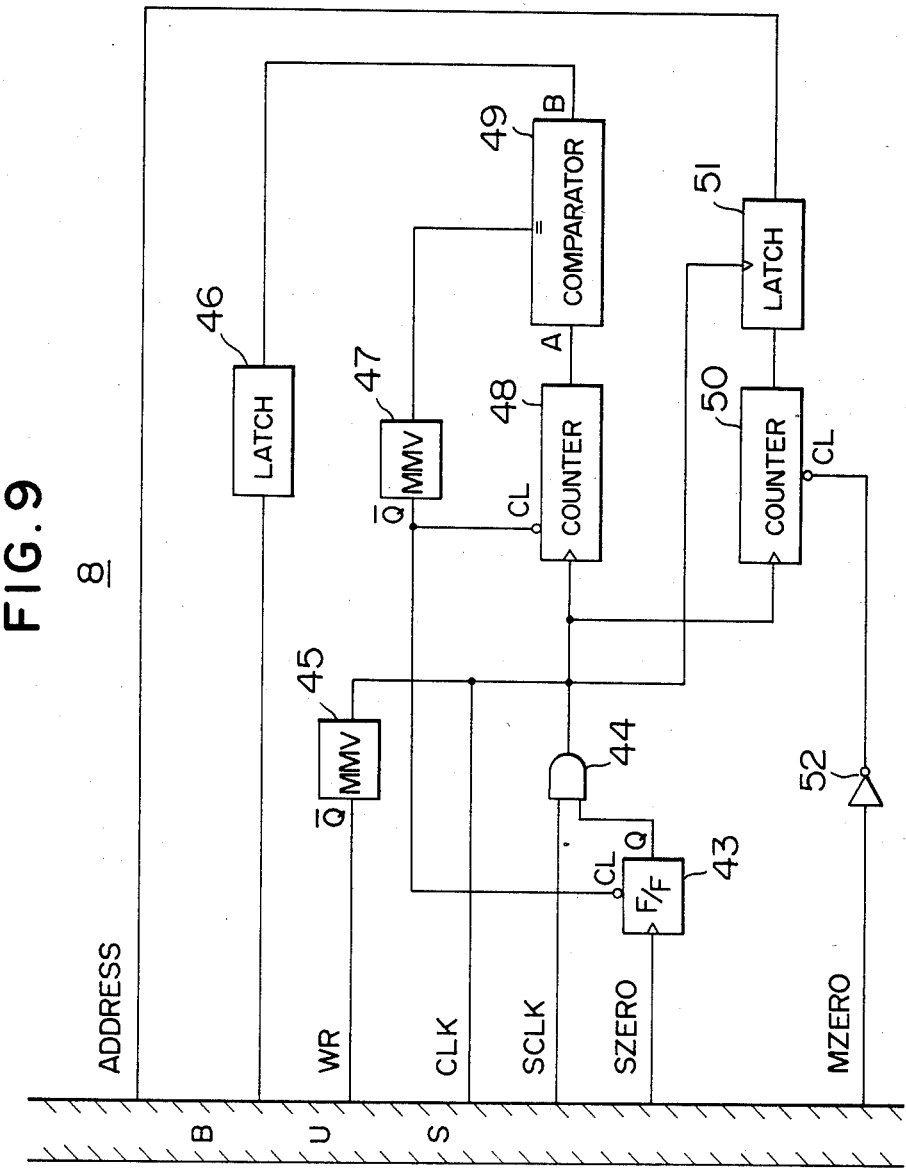
FIG. 9 is a circuit diagram showing one example of an address generating circuit.

The inspection surface of the printing cylinder CY is related to the signals MZERO, MEND, SZERO and SEND as indicated in FIG. 7. The aforementioned address generating circuit 8 operates to generate addresses on one inspection picture by the use of the outputs of the running position signal input circuit 5 and the scanning direction signal input circuit 6. In other words, by dividing the printing cylinder CY into n parts in the direction of rotation and into m parts in the direction of scan as shown in FIG. 8, the inspection picture is divided into addresses the number of which is as follows. The circuit 8 operates to generate the addresses. One example of the circuit 8 is as shown in FIG. 9.

$$\sum_{i=1}^{m} \sum_{j=1}^{n} A_{ij}$$

First, a counter 50 is cleared by the signal MZERO, to initiate addressing. Then, in response to the signal SZERO the addresses of the first line in the direction of scan are generated with the signal SCLK, and the number thereof is counted by a counter 48. This function is carried out a D type flip-flop 43, an AND circuit 44, and the counter 48.

The number of division in the direction of scan is set in a latch circuit 46 in advance. By comparison of the set value with the count value in a comparator 49, the number of addresses for one scanning line is determined. The address generated by a counter 50 is applied through a latch circuit 51 and the bus to the relevant circuits. The same operation is repeatedly carried out to the n-th line. In the example, an internal clock signal CLK for loading digital data in synchronization with an address and a write signal WR synchronous with an address for writing the loaded data in the reference data memory 14 and the buffer memory 16 are produced.

In the embodiment, in order to load image data in the apparatus of the invention which are provided by the photo-electric conversion of the IS 1, the A/D converter 2 and the digital interface 7 are employed.

In an ordinary A/D converter, with respect to its input analog signal, its output digital signal is linear. On the other hand, a density value D employed for man to recognize colors is logarithmic with respect to intensity, being represented by $D=\log_{10}(I_O/I)$ (where $I_O$ is the intensity at the time of incidence, and I is the intensity after transmission) for instance in a transmission density. Accordingly, in practice, an inspecting apparatus employing the logarithmic values of signals obtained through photoelectric conversion is desirable because the logarithmic values are closer to the man's sensuous scale.

Figure 10:
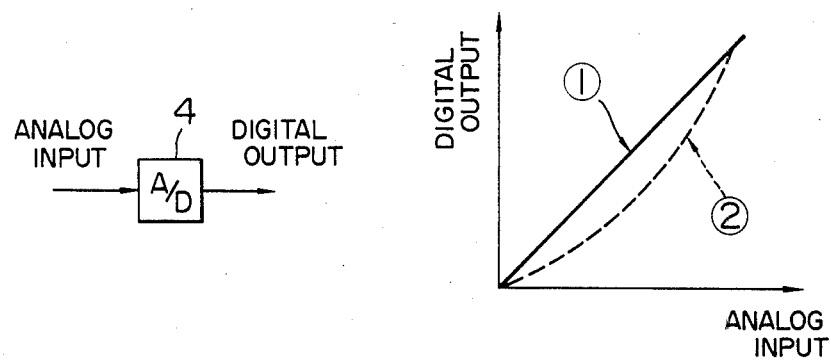
FIG. 10 is an explanatory diagram showing examples of the characteristics which are required for an analog-to-digital converter.

Accordingly, in the example, the A/D converter 2 is such that, when an analog input subjected to photoelectric conversion is inputted, a digital signal can be provided in accordance with both a linear characteristic (1) and a non-linear characteristic (2) as shown in FIG. 10, thus approximating a logarithmic characteristic also. In order to make the outputting timing of the digital data of the A/D converter 2 synchronous with the aforementioned addresses, the signal CLK from the address generating circuit 8 is utilized.

Figure 11:
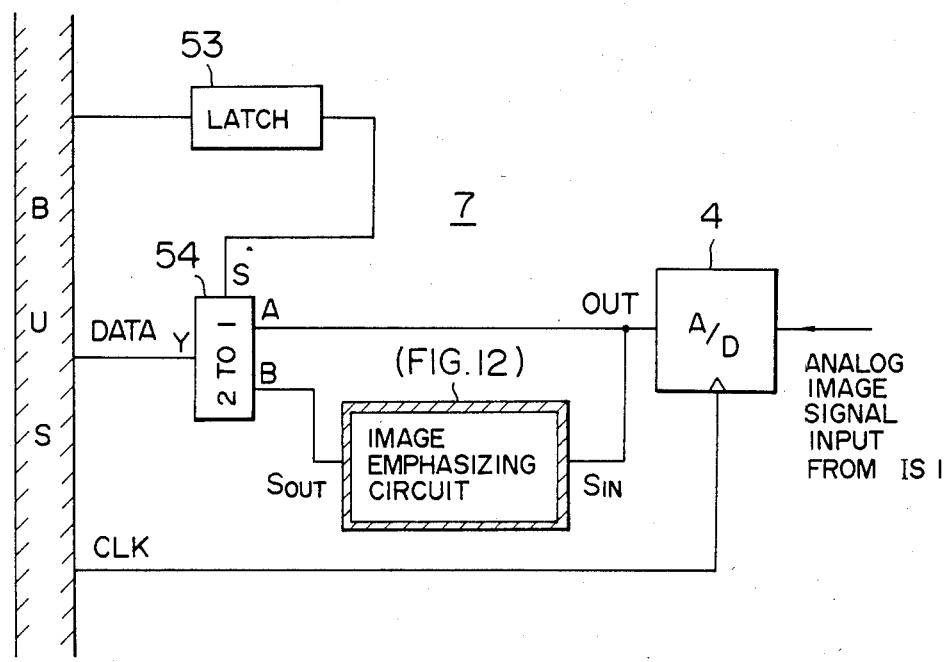
FIG. 11 is a circuit diagram showing one example of a digital input interface.

In the embodiment, a method of loading digital data, as they are, which are inputted to the digital interface 7 or a method of loading them with the image emphasized can be employed. The latter method is intended to emphasize the picture patterns on the surface of a print, thereby to emphasize the presence of defects, and can be practiced by spatial filtering Laplacian, and its one example is as shown in FIGS. 11 and 12.

In this connection, whether the digital data are used as they are or they are used after the image emphasis has been made is determined as follows: Those data have been set up by a latch circuit 53, so that one of the methods is selected by a signal selector 54 and the data are loaded in the apparatus.

Figure 12:
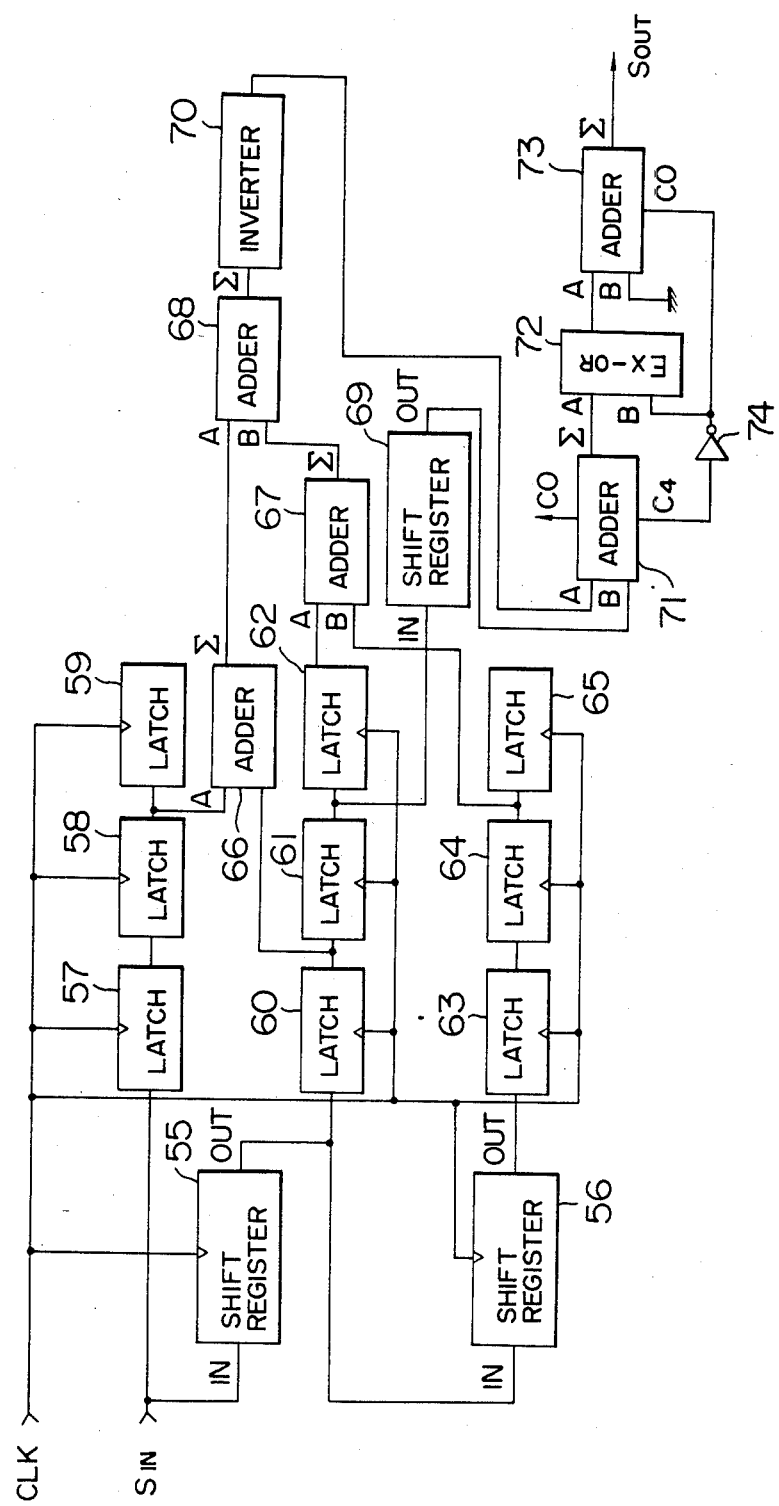
FIG. 12 is a circuit diagram showing one example of an image emphasizing circuit.

An image emphasizing circuit in FIG. 12 is of the following spatial filtering:

$$\begin{bmatrix} 0 & -1 & 0 \\ -1 & 4 & -1 \\ 0 & -1 & 0 \end{bmatrix}$$

That is, the density $D_{ij}$ of a picture element is represented by using those of four picture elements adjacent thereto. Therefore, $D_{ij}=4D_{ij}-(D_{i-1,j}+D_{i,j-1}+D_{i,j+1}+D_{i+1,j})$.

If, in this connection, nothing is limited, for instance, by arrangement, design, etc., then instead of four picture elements eight picture elements can be utilized. It goes without saying that the latter method provides better results.

In FIG. 12, shift registers 55 and 56 and latch circuits 57 through 65 are employed in order to obtain the data of necessary addresses, and in order to satisfy the above-described formula adders 66, 67, 68, 71 and 73, a shift register 69, inverters 70 and 74 and an EXCLUSIVE OR circuit 72 are employed. In the embodiment, the data are shifted with the aid of the signal CLK so as to be synchronous with the addresses generated by the address generating circuit 8.

Figure 13:
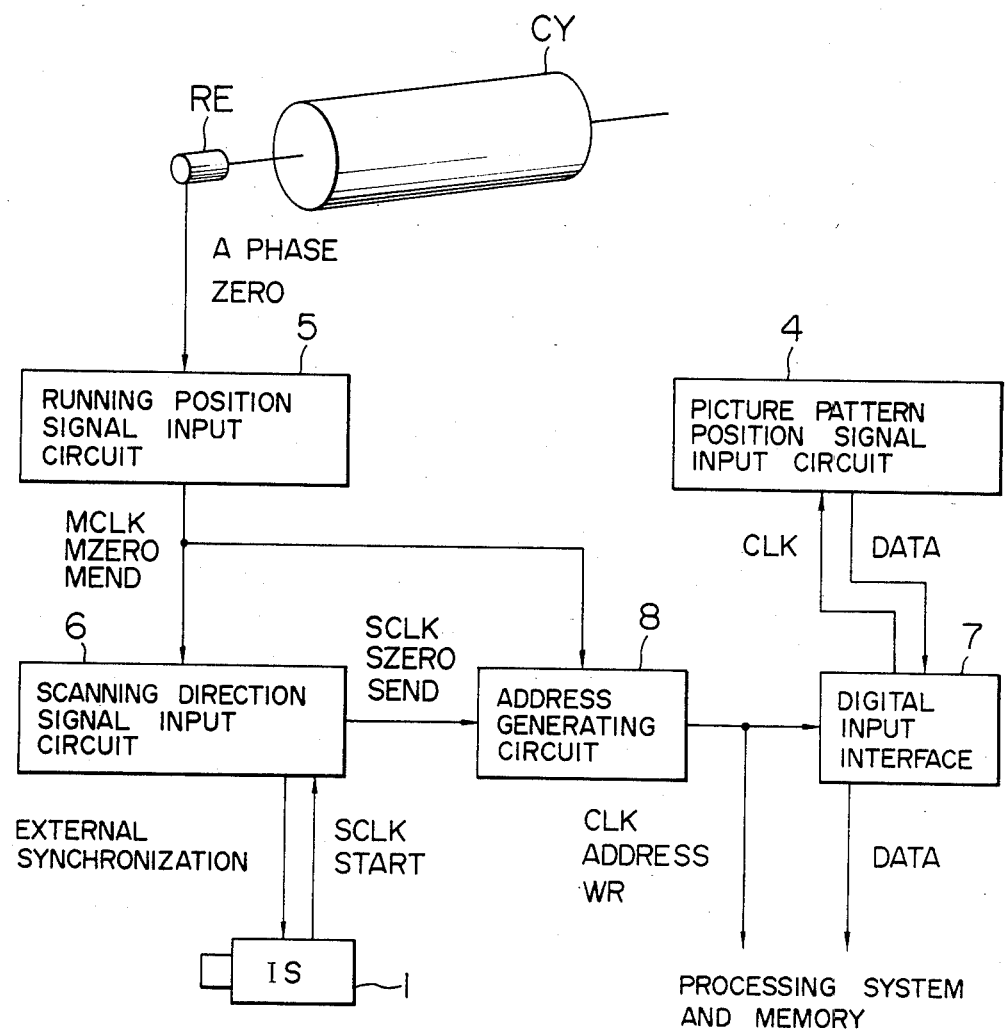
FIG. 13 is an explanatory diagram showing the arrangement of a data input system and its signal in combination.

The above-described data inputting system and the relevant signals can be summarized as shown in FIG. 13.

In the embodiment, all the system is controlled by the computer 21. In this connection, the inspecting apparatus of the invention has four functions according to the following modes:

(i) Set mode
   (ii) Reference mode
   (iii) Inspection mode
   (iv) Stop mode

These modes can be changed by a control command signal.

Figure 14:
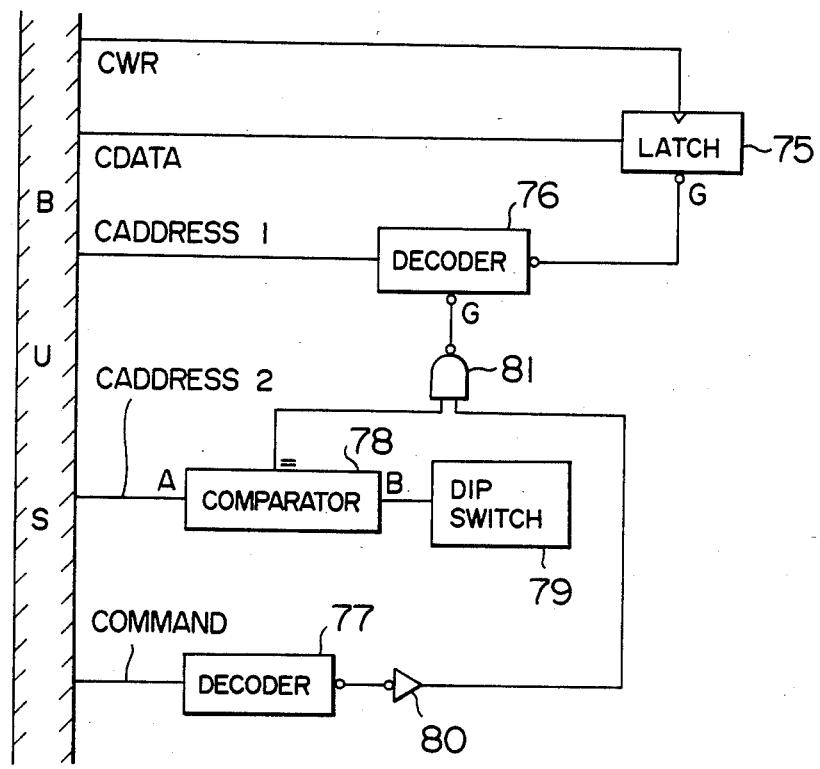
FIG. 14 is a circuit diagram showing one example of a common circuit arrangement.

First, in the set mode, set values are provided in the various circuits by the computer 21. For this purpose, the circuits have common components so as to receive data from the computer 21 as shown in FIG. 14. In FIG. 14, a value peculiar to the respective circuit is set in the dip switch 79.

In order to set a set value in one of the circuits, an address CAddress2 for selecting the circuit should coincide with the dip switch 79. In addition, the signal of a decoder 77 for decoding the command signal to allow the respective circuit to recognize the set mode and a signal CAddress1 which specifies a particular latch circuit (75 for instance) for setting data in the circuit are used to determine the final data set position. Data CDATA is written in the latch circuit 75 thus specified, with the aid of the signal CWR from the computer 21. As is clear from the above description, in the embodiment, the set values can be readily provided and changed by the computer 21.

When a satisfactory print is obtained by the printing operation, the mode is switched over to the reference mode (ii). As a result, data for one image which are inputted by the digital interface 7 are written in the reference data memory 14 by the use of the write signal WR and the address from the address generating circuit 8. For the next image, the mode of the inspecting apparatus is automatically changed into the inspection mode (iii). The data are compared, in real time, with the data which have been loaded in the reference mode.

For this purpose, the first, second and third feature extraction comparison decision circuits 9, 10 and 11 are provided. The stop mode (iv) is used to stop the functions of the inspecting apparatus.

Figure 15:
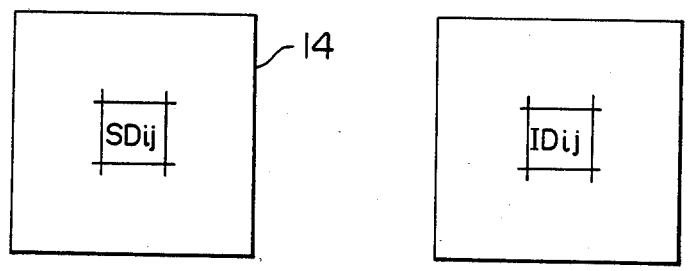
FIG. 15 is an explanatory diagram showing a comparison and decision operation for every picture element.

The first feature extraction comparison decision circuit 9 carries out the comparison and decision of a reference data SD and an inspection data ID with the same address for every picture elements. In other words, the circuit 9 operates to extract, as an unsatisfactory picture element, a picture element which is defined by the following expression:

$$|SD_{ij}-ID_{ij}| > \text{Decision level}$$

where $SD_{ij}$ is the data which is read out of the reference data memory 14, and $ID_{ij}$ is the data which can be inputted through the digital interface 7 in real time, as shown in FIG. 15.

Figure 16:
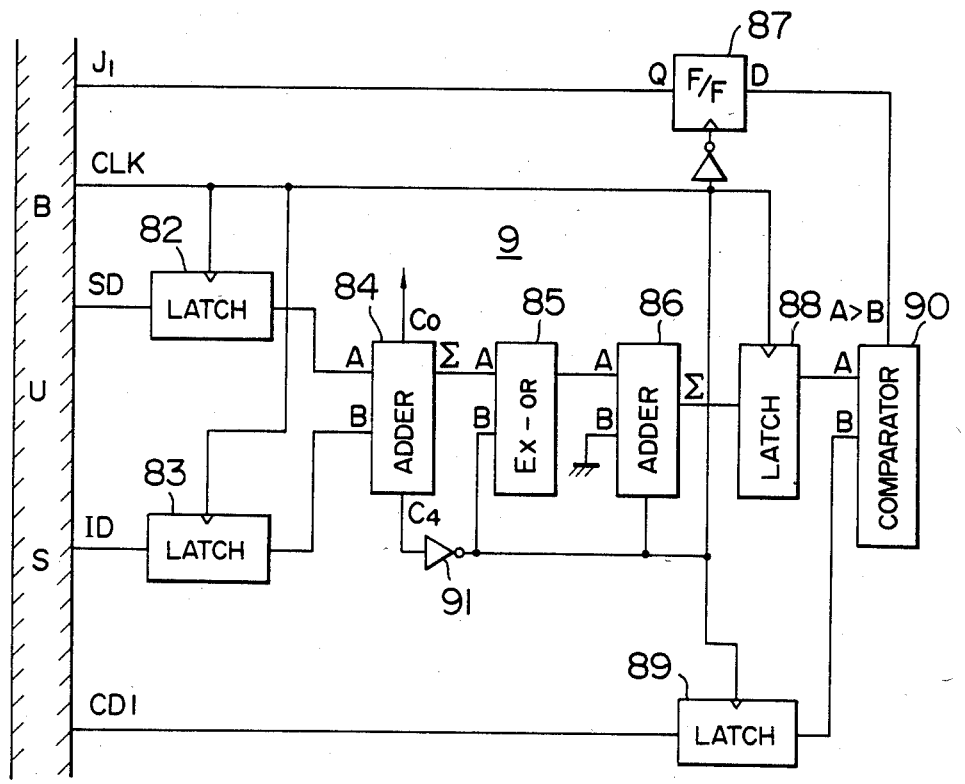
FIG. 16 is a circuit diagram showing one example of a first feature extraction comparison decision circuit.

One example of the circuit 9 is as shown in FIG. 16. The data SD read out of the reference data memory 14 and the data ID inputted through the digital interface 7 are supplied to latch circuits 82 and 83, respectively, and are processed by adders 84 and 86, an EXCLUSIVE OR circuit 85 and an inverter 91, as a result of which the absolute value of the difference between the data SD and ID is written in a latch circuit 88. Thereafter, in a comparator 90, the output of the latch circuit 88 is compared with a decision level data CD1 which is read out of the picture control data memory 15 and set in a latch circuit 89 in synchronization with the above-described data. The result of comparison is outputted, as a decision result J1, by a D type flip-flop 87 picture element by picture element.

Figure 17:
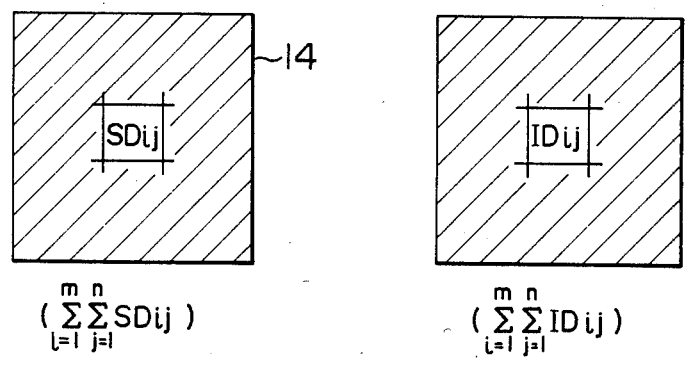
FIG. 17 is an explanatory diagram showing a comparison and decision operation by the sum of picture elements.

In the second feature extraction comparison decision circuit 10, as shown in FIG. 17, the absolute value of the difference between the sum of reference data for one image and the sum of inspection data for one image is obtained and compared with the decision level. In other words, the circuit 10 operates to perform the comparison of the following:

$$\sum_{i=1}^{m}\sum_{j=1}^{n} SDij \text{ and } \sum_{i=1}^{m}\sum_{j=1}^{n} IDij$$

where n is the number of division, in the direction of rotation, of the printing cylinder CY, m is the number of division, in the direction of scan, of the IS 1, SDij is the reference data, and IDij is the inspection data.

Accordingly, the accuracy of detecting low density defects scattered over the entire image or moderate density variations is improved.

Figure 18:
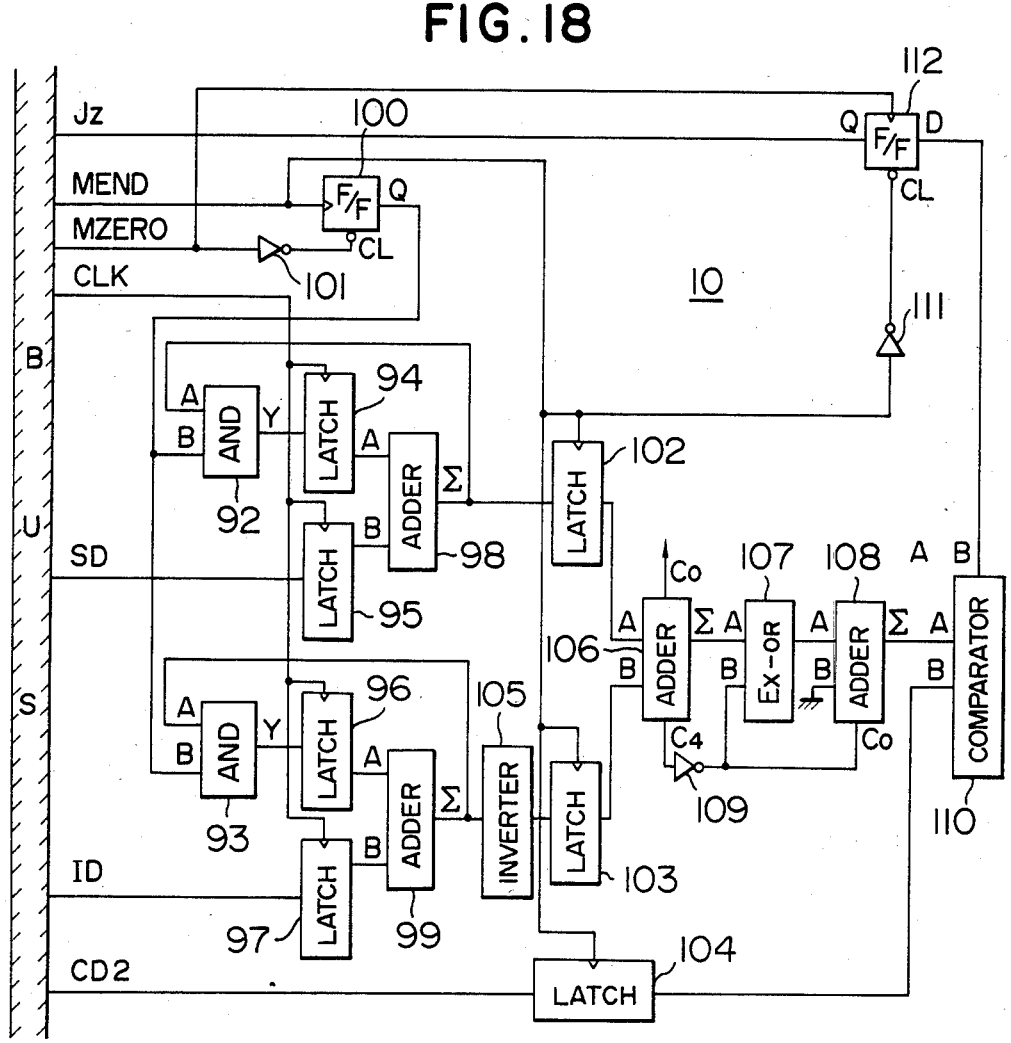
FIG. 18 is a circuit diagram showing one example of a second feature extraction comparison decision circuit.

One example of the circuit 10 is as shown in FIG. 18. The data SD read out of the reference data memory 14 are added by means of latch circuits 94 and 95, an adder 98 and an AND circuit 92 for one image, and the result of addition is written in a latch circuit 102 with the aid of the MEND signal. The inspection data loaded through the digitial interface 7 are similarly processed by means of latch circuits 96 and 97, an adder 99 and an AND circuit 93. In the case of the data ID, the result of addition is written in a latch circuit 103 through an inverter 105 for conversion into the complement of one because the difference between both is required. In order to clear the addition data, a signal "0" is inputted to the latch circuits 94 and 96 through the AND circuits 92 and 93 once an image. For this purpose, the signal "0" is provided by a D type flip-flop 100 with the aid of the signal MEND and the signal MZERO once an image.

The sum of the reference data thus processed for all the picture elements and the sum of the inspection data thus processed for all the picture elements are applied to one input A of a comparator 110 through a circuit for obtaining the absolute value of a difference which comprises adders 106 and 108, an EXCLUSIVE OR circuit 107 and an inverter 109. The input is compared with a decision level data CD2 read out of the picture element control data memory 15. When the input is higher than the decision level, it is outputted as a decision signal J2 by a D type flip-flop 112 once an image.

Figure 19:
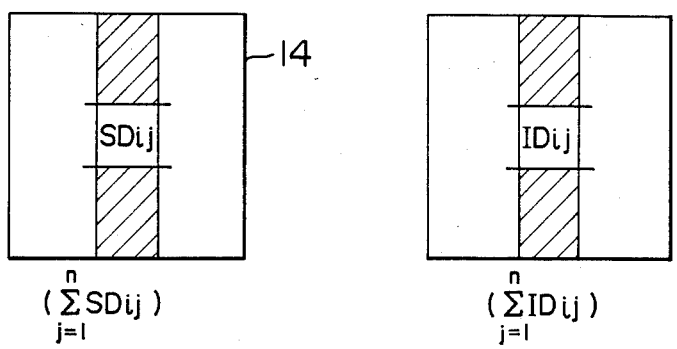
FIG. 19 is an explanatory diagram showing a comparison and decision operation by the sum of picture elements in a particular direction.

In the third feature extraction comparison decision circuit, as shown in FIG. 19, the absolute value of the difference between the sum of the reference data SD in the direction of run of the print P, i.e., in the direction of rotation of the printing cylinder CY and the sum of the inspection data in the same direction is obtained and compared with the decision level. In other words, the circuit 11 carries out the comparison of the following:

$$\sum_{j=1}^{n} SDij \text{ and } \sum_{j=1}^{n} IDij$$

where SDij is the reference data, and IDij is the inspection data.

With the circuit 11, the accuracy of detecting defects (such as doctor stripes) in the direction of rotation which occur frequently with gravure prints.

Figure 20:
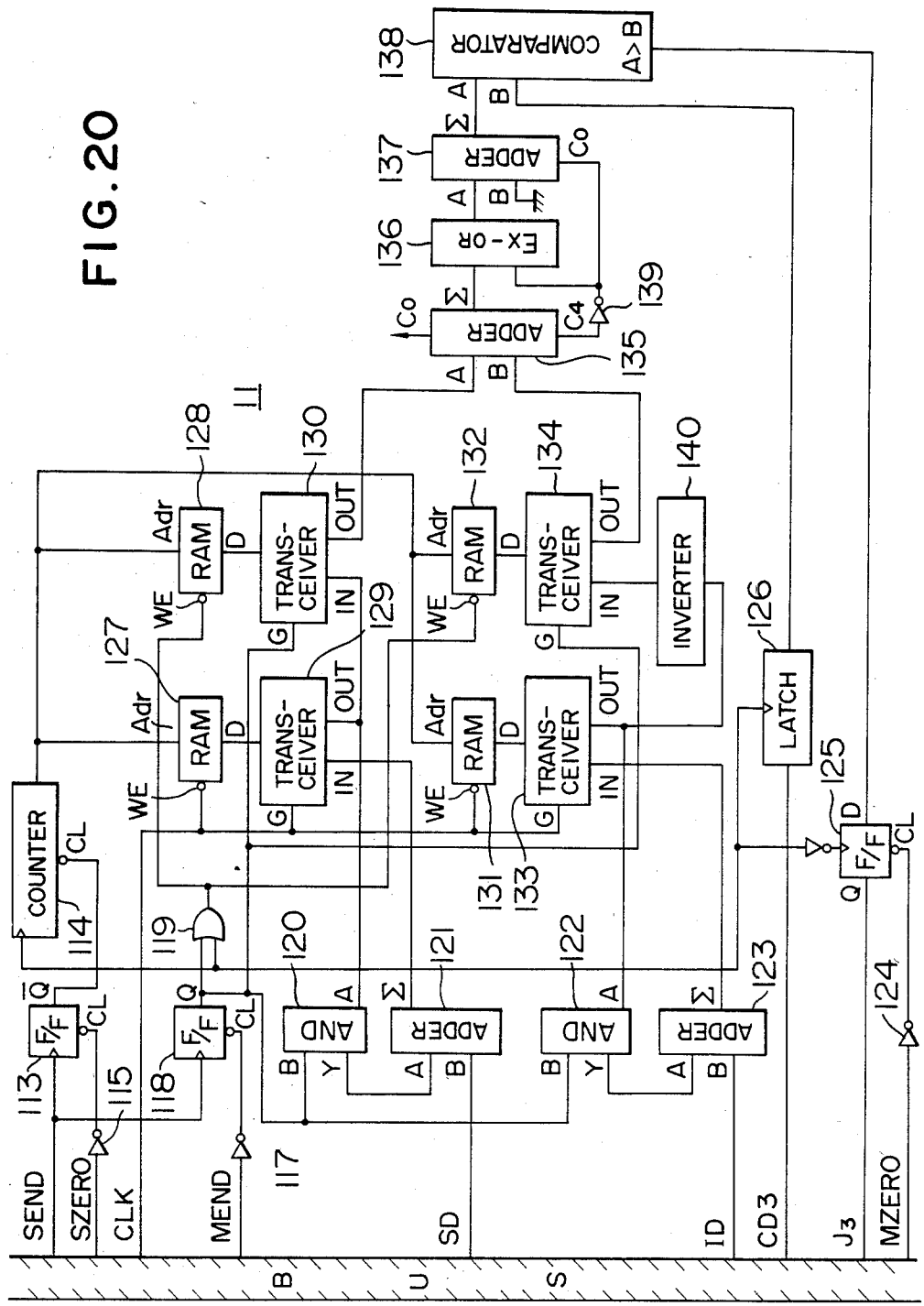
FIG. 20 is a circuit diagram showing one example of a third feature extraction comparison decision circuit.

One example of the circuit 11 is as shown in FIG. 20. The data SD read out of the referene data memory 14 are processed by an AND circuit 120, an adder 121, a memory 127 and a transceiver 129, so that the sum $$\sum_{j=1}^{n} SDij$$

in the direction of rotation at each division point in the direction of scan is calculated. The content of the memory 127 is renewed to data added scanning line by scanning line, and finally to data for one image which are added in the direction of rotation. On the other hand, the inspection data ID obtained through the digital interface 7 are similarly processed by means of an AND circuit 122, an adder 123, a memory 131 and a transceiver 133. In order to access the memories 127, 128, 131 and 132, a D type flip-flop 113 and a counter 114 are employed to generate addresses for every scanning line. In order to process the result of addition in the direction of rotation, during addition of one line of the next inspection picture the data of the preceding inspection picture are written in the memories 128 and 132 through the transceivers 130 and 134, and the preceding picture is determined for acceptability with the timing of the second line or after.

With the circuit 11, the real time processing can be performed continuously.

In order to provide the above-described timing, a D type flip-flop 118, an OR circuit 119 and the signals SEND, MEND and CLK are employed. The inspection data ID is written in the memory 132 after being converted into the complement of one by an inverter 140, because it is necessary to obtain the difference between the data ID and the reference data SD later.

The absolute value of the difference between the sum $$\sum_{j=1}^{n} SDij$$

in the direction of rotation at the scanning division points and the corresponding sum $$\sum_{j=1}^{n} IDij$$

is calculated by a circuit which comprises adders 135 and 137, an EXCLUSIVE OR circuit 136 and an inverter 139. The output of the circuit is applied to a comparator 138, where it is compared with a decision level data CD3 which is read out of the picture element control data memory 15. When the output is higher than the decision level, it is outputted as a decision signal J3 by a D type flip-flop 125.

In the general decision circuit 12, the results provided through the comparison and decision of the first, second and third feature extraction comparison decision circuits 9, 10 and 11 are generally judged as one detected picture, so that they are outputted as signals for operating a marker, alarm unit or peripheral output units.

The circuit determines that the detected picture is unsatisfactory only when the defect signal of the first feature extraction comparison decision circuit 9 occurs the number of times more than a certain decision level. Thus, in the inspecting apparatus, depending on the required contents of inspection the decision level for unsatisfactory prints can be changed.

On the other hand, the defect outputs of the second and third feature extraction comparison decision circuits 10 and 11 mean serious defects. Therefore, even if only one defect output is provided for the detected picture, the entire picture is determined unsatisfactory.

Figure 21:
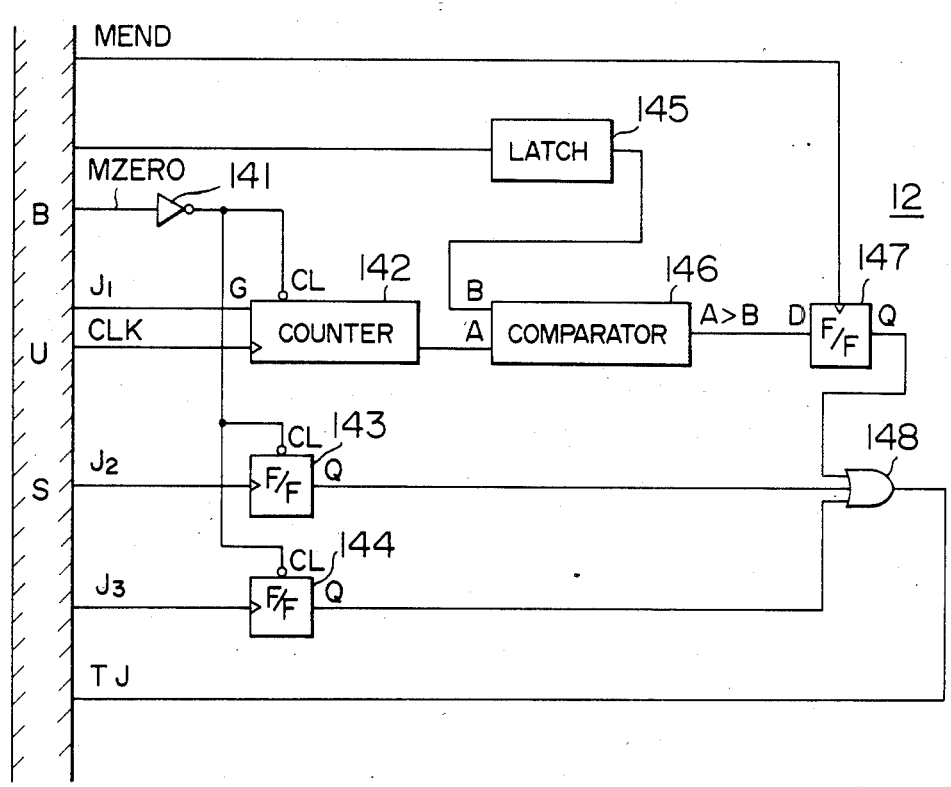
FIG. 21 is a circuit diagram showing one example of a general decision circuit.

One example of the general decision circuit is as shown in FIG. 21. As the decision output J1 of the first feature comparison decision circuit 9 is applied to the gate of the counter 142, the number of picture elements, i.e., the number of signals CLK is counted only when the defect signal is provided. In a comparator 146, the number of defects in one picture is compared to a decision level set in a latch circuit 145. When the former exceeds the latter, then the detected picture is determined unsatisfactory, and the signal MEND is applied to a D type flip-flop 147 to set the latter.

The decision outputs J2 and J3 of the second and third feature extraction comparison decision circuits 10 and 11 are applied to D type flip-flop 143 and 144 as they are. Therefore, immediately when a defect signal is produced for the inspected picture, the D type flip-flops 143 and 144 are set. Depending on the presence or absence of the above-described three signals, a detected-picture general decision signal TJ is outputted through an OR circuit 148.

Accordingly, prints which are moved at high speed during printing can be inspected with high accuracy and in real time by monitoring the general decision signal TJ from the general decision circuit 12.

Now, the picture pattern position detector 3, the picture pattern position signal input circuit 4 and the reference data memory rewrite signal generating circuit 13 will be described.

As was described before, the inspecting apparatus of the invention is applied mainly to a rotary press.

The position of a picture pattern, which is formed successively on a print by such a rotary press, is not always constant in a direction perpendicular to the direction of run of the print, i.e., in the print width direction. In other words, when prints are supplied to a multi-color rotary press, they are shifted considerably in the widthwise direction. Therefore, in such a case, the operator moves the printing cylinder of the press in the widthwise direction to adjust the printing position, or the printing position is automatically adjusted. Thus, even if a printing operation is normal to provide a correct picture pattern, the position of the picture pattern is not always the same in the widthwise direction of the print.

The inspecting apparatus of the invention employs a system that inspection data are compared with reference data read out of the reference data memory 14 to determine the acceptability of prints. Therefore, if the position of a picture pattern on a print P when the data are written in the reference data memory 14 is shifted in the widthwise direction from that of the picture pattern on the print P when the inspection data are read, these data do not coincide with each other although the picture pattern is satisfactory; i.e., the operation becomes erroneous.

This will be described with reference to FIGS. 22 and 23 in more detail.

Figure 22:
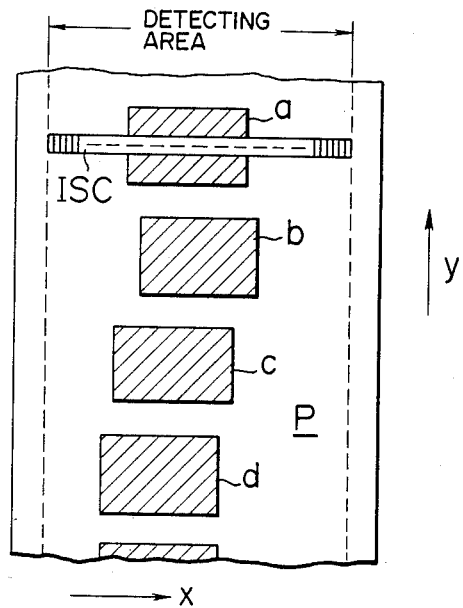
FIG. 22 is an explanatory diagram showing picture patterns shifted on a print.

In FIG. 22, reference character ISC designates the image pickup unit of an image sensor which is included in the IS 1 (FIG. 3), the image pickup unit comprising, for instance, 512 photo-electric conversion elements arranged linearly in the widthwise direction of the print P; and a through d, picture patterns which are successively printed on the surface of the print P.

As was described above, the positions of these picture patterns are shifted in the direction x of the print P, i.e., in the widthwise direction of the print P, from one another.

Figure 23:
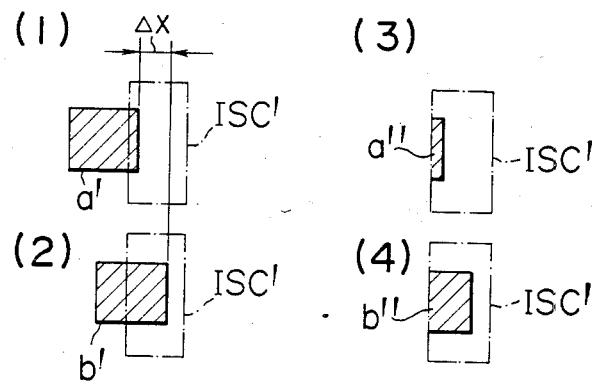
FIG. 23 is an explanatory diagram showing the variations of picture element intensity due to the displacement of picture patterns.

In FIG. 23, reference character ISC' designates one of the photo-electric conversion elements forming the photoelectric converter ISC; and a' and b', one of the picture elements of the picture pattern a and one of the picture elements of the picture pattern b, respectively.

It is assumed that, with the picture pattern a in FIG. 22, the data is written in the reference data memory 14, and thereafter the data of the picture pattern b is read out. Furthermore, it is assumed that, as a result, the positional relation between the picture element a' of the picture pattern a and the photoelectric conversion element ISC' is as shown in the part (1) of FIG. 23, and the positional relation between the picture element b' of the picture pattern b and the photoelectric conversion element ISC' is as shown in the part (2) of FIG. 23.

In this case, the density data written in the corresponding address in the reference data memory 14 corresponds to the area a" in the part (3) of FIG. 23, and the inspection data corresponds to the area b" in the part (4) of FIG. 23.

Accordingly, although the picture patterns a and b are the same, the data read out of the reference data memory 14 does not coincide with the inspection data; that is, in spite of the correct picture pattern, the print is determined unacceptable.

In order to overcome this difficulty, the reference data memory rewrite signal generating circuit 13 is provided. The circuit 13 receives a picture pattern position signal from the picture pattern position detector 3 and holds picture pattern position data provided when data are written in the reference data memory 14. Thereafter, in the circuit 13, the picture pattern position data is compared with that which is received whenever inspection data are read, and when the difference between the two data is larger than a predetermined value, a reference data memory rewrite signal is produced. For this purpose, the picture pattern position detector 3 has an image sensor, so that the position, in the widthwise direction, of a picture pattern printed on the surface of a print P is detected, and a picture pattern position signal is applied through the picture pattern position signal input circuit 4 to the bus.

Figure 24:
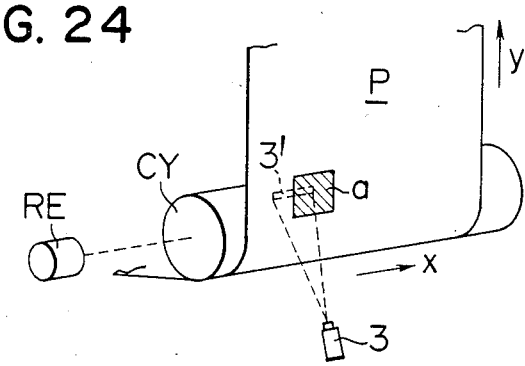
FIG. 24 is an explanatory diagram showing the operation of a picture pattern position detector.

One example of a method of detecting a picture pattern position with the picture pattern position detector 3 is as shown in FIG. 24.

In FIG. 24, reference character a designates a picture pattern printed on a print P; and 3', a detection region by the picture pattern position detector 3.

The picture pattern position detector 3 picks up the image of a predetermined region, in the direction x, of the picture-pattern-printed surface of the print P which is continuously moved in the direction y, and, with the aid of the rotary encoder RE, produces a detection signal when the predetermined region comes in the detection region. Therefore, where the position of the picture pattern a on the print P is shifted in the widthwise direction, or in the direction x, the size of the part of the picture pattern a which is covered by the detection region 3' is changed, and accordingly the amount of light incident to the picture pattern position detector 3 is changed.

Accordingly, the position, in the direction x, of the picture pattern a can be detected by detecting the amount of light applied to the picture pattern position detector 3. Therefore, the light quantity detection signal of the detector 3 is employed as a picture pattern position signal which is supplied through the picture pattern position signal input circuit 4 to the bus.

Figure 25:
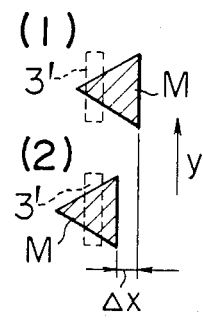
FIGS. 25 and 26 are explanatory diagrams showing position detecting marks.

FIG. 25 shows another example of the method of detecting a picture pattern position. In FIG. 25, reference character M designates a wedge-shaped registering mark. In the case of a multi-color rotary press, for automatic registration in the print width direction, the wedge-shaped registering mark is provided in the margin of a print. In the example, the image of the registering mark M is picked up by the picture pattern position detector 3, and as shown in the parts (a) and (b) of FIG. 25 the variation of the area of the registering mark M which is included in the detection region is detected as a variation in the quantity of light from the picture pattern position variation $\Delta x$ in the widthwise direction, to provide the picture pattern position signal.

Therefore, according to the example, the detecting operation can be carried out more positively because a mark suitable for position detection can be employed irrespective of a picture pattern employed.

Figure 26:
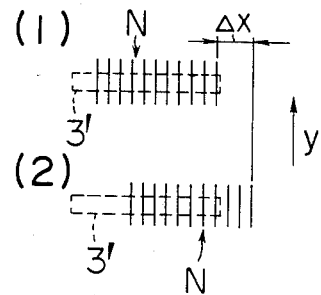

FIG. 26 shows another example of the picture pattern position detecting method. In FIG. 26, reference numeral N designates a position shift detecting mark which is printed on the margin of a print.

The mark N consists of a number of segments which are arranged in the direction of width (x) of the print and are in parallel with the direction of run (y). In the method, a picture pattern position signal is provided by the utilization of the fact that, according to a position variation $\Delta x$ in the direcłon of width, the number of segments covered by the detecting region 3' changes.

Thus, according to the example, the picture pattern position signal can be readily obtained as the number of pulses.

Figure 27:
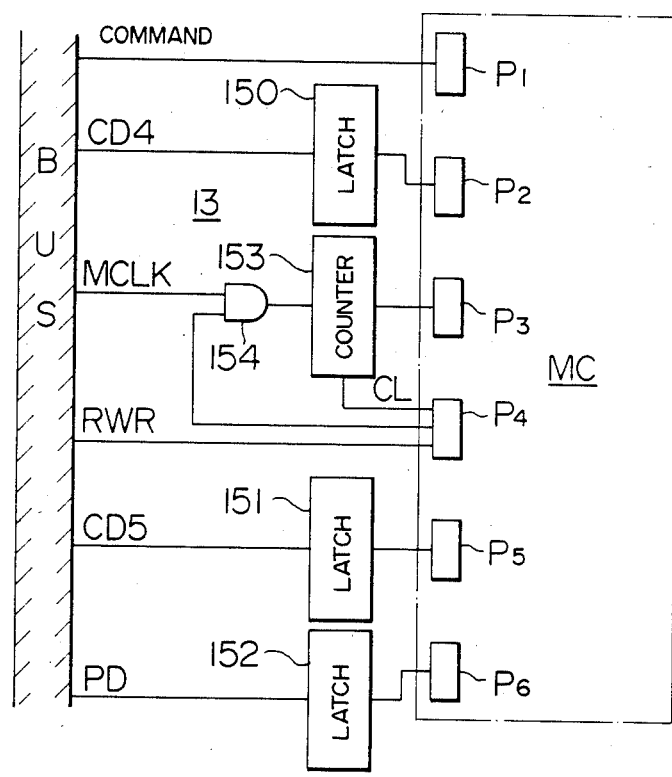
FIG. 27 is a circuit diagram showing one example of a reference data memory rewrite signal generating circuit.

FIG. 27 shows one example of the reference data memory rewrite signal generating circuit 13. The circuit 13 is made up of a microcomputer MC having input/output ports $P_1$ through $P_6$, latch circuits 150 through 152, a counter 153 and an AND circuit 154.

Figure 28:
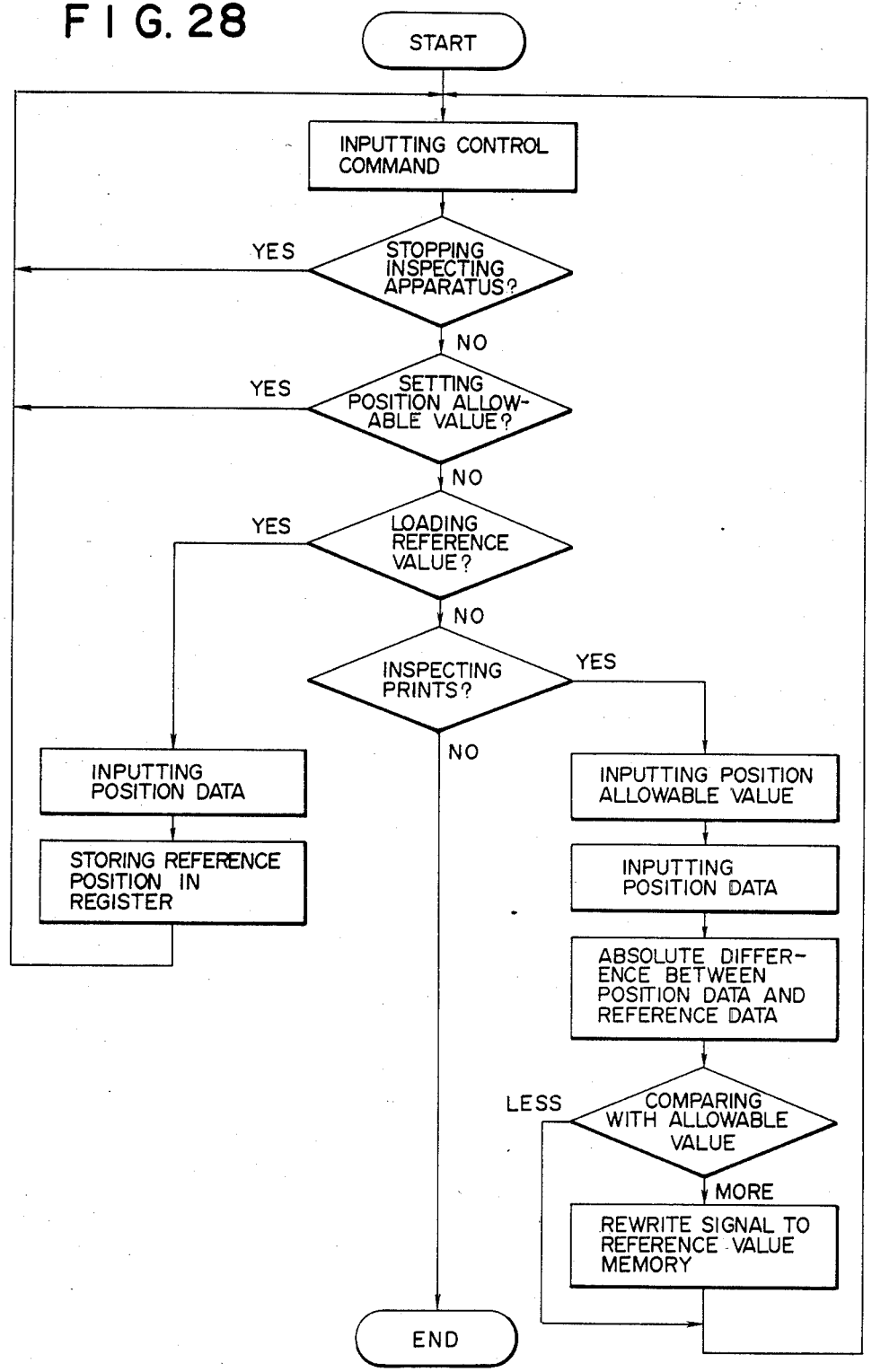
FIG. 28 is a flow chart for a description of the operation of the circuit in FIG. 27.

FIG. 28 is a flow chart for a description of the operation of the circuit 13. When the microcomputer MC starts according to the flow chart, the microcomputer MC determine what the content of the control command COMMAND is. When the content is the "stop" or "set" mode, reading the control command COMMAND is repeated. However, in the case of the "set" mode, position allowable value data CD is inputted through the latch circuit 150 to the port $P_2$ of the microcomputer MC.

When the content of the control command COMMAND is the "reference" mode, the picture pattern position data PD is inputted through the latch circuit 152 to the port $P_6$ of the microcomputer MC, and is stored as the reference position data of the picture pattern provided when the reference value data is read. Thereafter, the control command COMMAND is read.

When the content of the control command COMMAND is the "inspection" mode, the operation is as follows:

(1) The position allowable value data CD4, which is inputted to the port $P_2$ in the "set" mode, is transferred to a register in the microcomputer MC;

(2) Similarly as in the "reference" mode, the picture pattern position data PD is received. The data thus received is compared, as the position data in receiving the detection value data, with the reference position data, to calculate the absolute value of the difference therebetween;

(3) The absolute value of the difference is compared with the position allowable value data CD4. When the former is larger than the latter, a reference data memory rewrite signal is generated; and (4) Reading the control command COMMAND is carried out again.

Thus, according to this example, when the position shift, in the direction of width, of the picture pattern on the print P becomes larger than a preset value, the reference value memory rewrite signal generating circuit 13 supplies the rewrite signal RWR to the reference data memory 14. Thereupon, the image data, which is read by the IS 1, is written, as a new reference data, in the reference data memory 14. The inspection data are determined according to the new reference data until the rewrite signal RWR is generated again. Therefore, even if the printed picture pattern is shifted in the direction of width which is perpendicular to the direction of run of the print, no erroneous operation is made, and it can be determined correctly whether or not the picture pattern is acceptable.

Now, the function which is performed by the latch circuit 151, the counter 153 and the AND circuit 154 in the reference data memory rewrite signal generating circuit 13 will be described.

Figure 29:
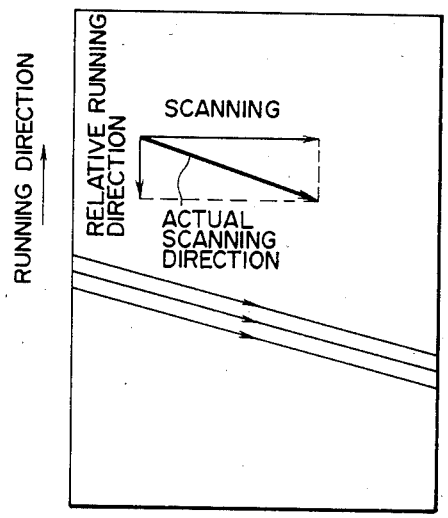
FIG. 29 is an explanatory diagram showing the relationships between a print running speed and an actual scanning direction.

As was described before, with the inspecting apparatus of the invention, the print P run at high speed is scanned by the IS 1 made up of the one-dimensional line sensors in the direction x perpendicular to the direction of run y as shown in FIG. 29, so that the image data is read. Therefore, the image data is actually read by the IS 1 in a direction A which is obtained by combining the direction of run (y) of the print P and the direction of scan (x) of the IS 1.

Figure 30:
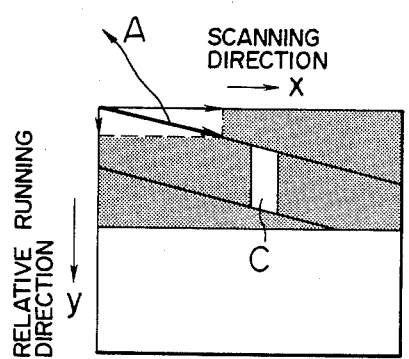
FIG. 30 is an explanatory diagram showing variations in picture pattern reading state which are due to variations in print running speed.
Figure 30:
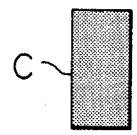
Figure 30:
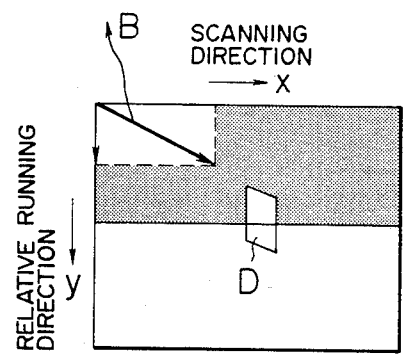
Figure 30:
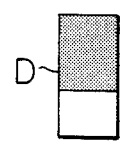
Figure 31:
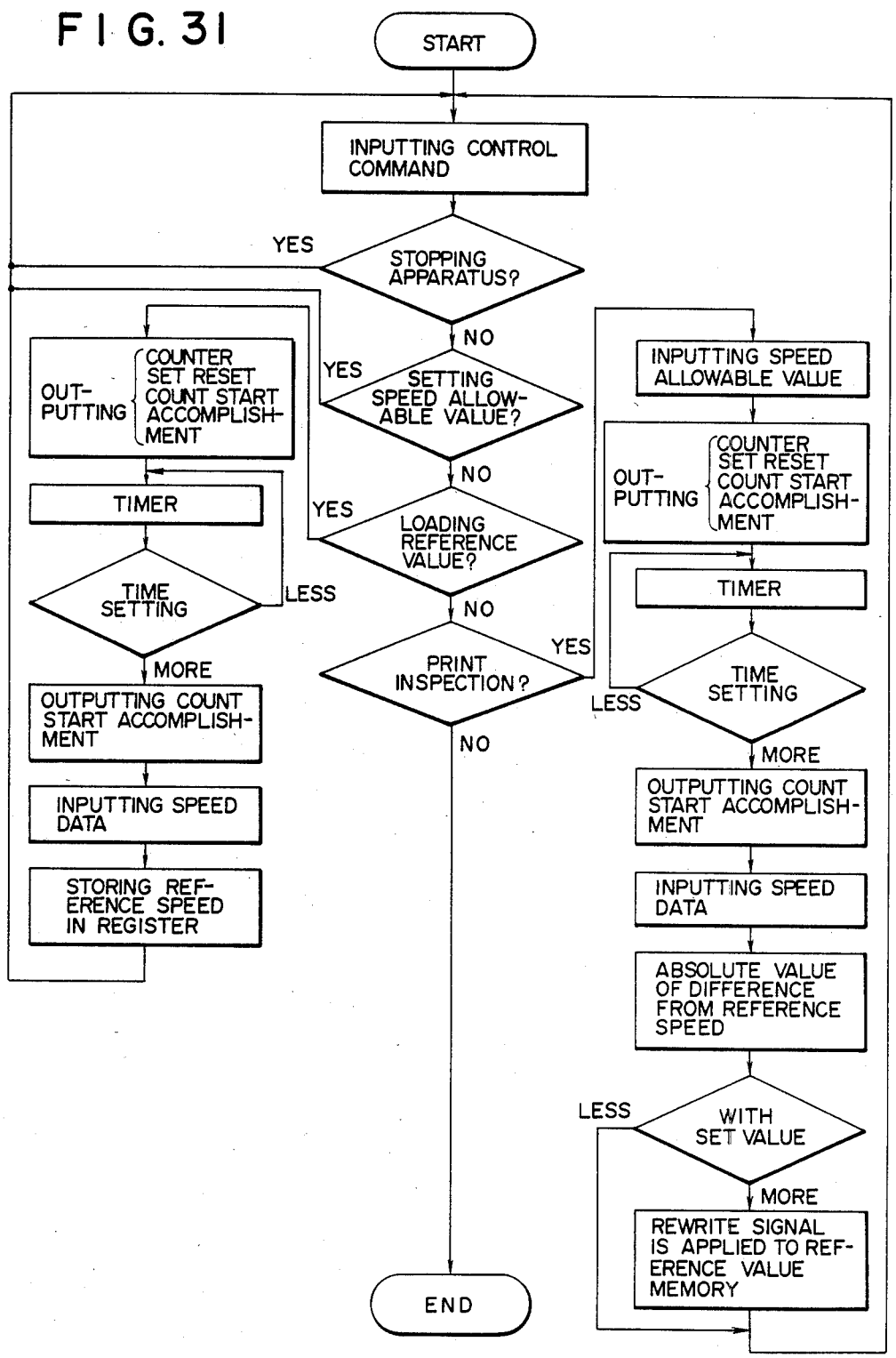
FIG. 31 is a flow chart showing one example of a reference data memory rewriting operation according to running speed.

Accordingly, as the speed of run of the print P changes, the image data reading direction A is also changed from that shown in the part (a) of FIG. 30 to that shown in the part (b) of FIG. 30, for instance. In other words, if, even under the condition that the speed of scan of the IS 1 is maintained constant, the speed of run of the print changes, then the direction of read (A) by the IS 1 is changed into that (B).

Let us consider the same picture element detecting regions C and D of the IS 1 in the parts (a) and (b) of FIG. 30. In the part (a), the region reads black picture pattern data. On the other hand, in the part (c), white picture pattern data are partly included in the detecting region. Thus, although the same picture pattern has been read, the picture element data of the corresponding addresses differ from each other.

Accordingly, if the speed of run of the print P in setting the reference data is different from that in reading the inspection data, then the result of inspection will be erroneous.

In order to eliminate this difficulty, the speed allowable value data CD 5 is supplied to the latch circuit 151, the signal MCLK supplied to the bus through the running position signal input circuit 5 by the rotary encoder RE is inputted to the AND circuit 154, and when the difference between the speed of run of the print P in setting the reference data and the speed of run of the print P in reading the inspection data is more than the allowable value, the signal RWR is produced. This will be described with reference to a flow chart shown in FIG. 31.

When the signal is supplied to the circuit 13 through the bus, the microcomputer MC reads the content of the control command COMMAND. When the content is the "stop" or "set" mode, reading the control command COMMAND is repeated. However, in the case of the "set" mode, the speed allowable value data CD5 is written in the port $P_5$ of the microcomputer MC through the latch circuit 151.

In the case where the content of the control command COMMAND is the "reference" mode, the operation is as follows:

(1) After the counter 153 is reset by a signal outputted by the microcomputer MC, a count start signal is applied to the AND circuit 154, and the pulse MCLK from the rotary encoder RE is received;

(2) The microcomputer MC counts a predetermined period of time;

(3) The microcomputer MC supplies a count finish signal to the counter 153, and receiving the pulse MCLK from the rotary encoder RE is finished;

(4) The count value of the counter 153 is inputted through the port $P_3$ to the microcomputer MC, and is stored, as the running speed data in receiving the reference value data, in the register in the microcomputer MC; and (5) Reading the control command COMMAND is effected again.

In the case where the content of the control command COMMAND is the "inspection" mode, the operation is as follows:

(1) The speed allowable value data, which is inputted to the port $P_5$ in the "set" mode, is transferred to the register in the microcomputer MC;

(2) Similarly as in the "reference" mode, the pulse MCLK from the rotary encoder RE is received;

(3) The absolute value of the difference between the running speed data in receiving the inspection value data and that in receiving the reference value data is obtained;

(4) When the absolute value of the difference is more than a predetermined value in view of the speed allowable value, the reference value memory rewrite signal RWR is outputted to the bus; and (5) Reading the control command COMMAND is carried out again.

As was described above, in the embodiment, the speed data, in receiving the inspection value data, of a print under inspection is compared with the speed data in receiving the reference value data which has been stored in advance, and when the difference exceeds the predetermined value, the reference value data is rewritten. Therefore, the erroneous decision of prints under inspection, which attributes to the difference in running speed, can be prevented according to the invention.

Another embodiment of the invention using the picture element control data memory 15 will described.

Figure 32:
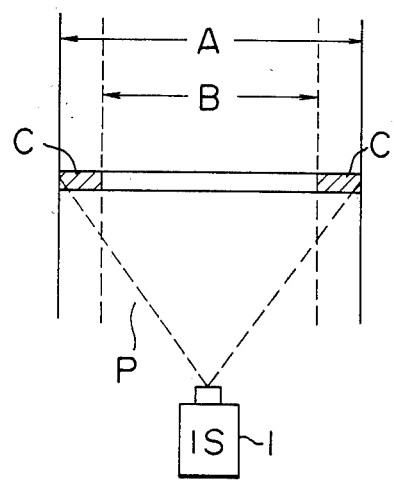
FIG. 32 is an explanatory diagram showing why masking is required in inspecting prints.

In a rotary press to which the technical concept of the invention is applicable, prints P are not always constant in width; that is, frequently printing is made by using printing sheets different in width. In this case, it is desirable that the width of the inspection region is changed. More specifically, it is desirable that, when a print's width A is changed to one B as shown in FIG. 32, the portions C are masked.

Figure 33:
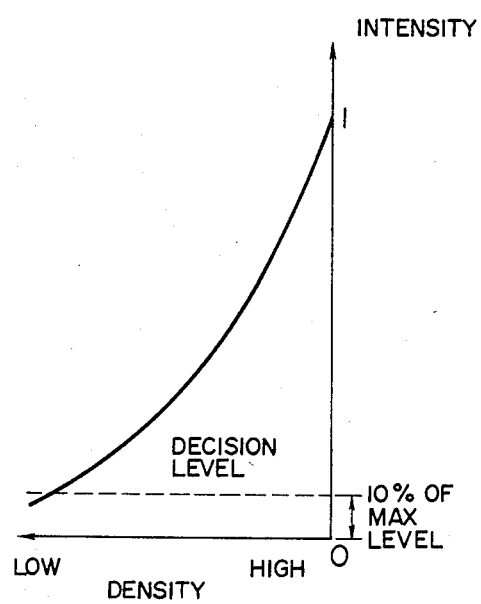
FIGS. 33 and 34 are characteristic diagrams for a description of the relationships between picture pattern density and optical intensity and decision levels.
Figure 34:
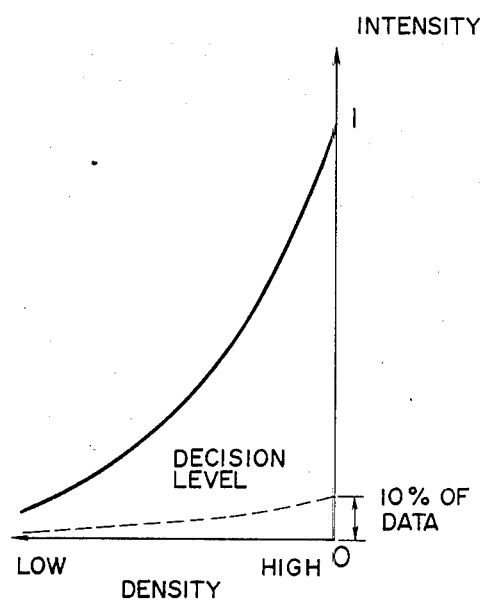

In such an inspecting method, the relation between print picture pattern densities and detected intensities are logarithmic as indicated in FIG. 33. Therefore, if the decision level in comparison of reference data and detection data is fixed as shown in FIG. 33, then in the low density range the absolute difference between the detected intensity and the decision level is insufficient, and accordingly it is impossible to determine whether or not the picture pattern is acceptable. Accordingly, it is desirable that the decision level is changed as a function of the reference data (by multiplying the latter by a ratio (0 through 1) for instance 10%).

Figure 35:
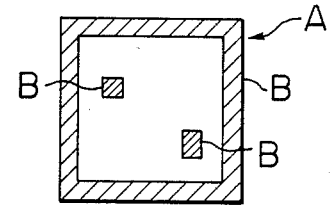
FIGS. 35 and 36 are explanatory diagrams showing effects of the invention.

Furthermore, it is preferable that portions B of one picture A are masked as shown in FIG. 35, and that the decision level is changed according to a portion D (such as a margin) of a picture pattern C for which no inspection is required, a portion E for which ordinary inspection should be performed and a portion F which should be inspected especially strictly. That is, it is desirable that the decision level is finely controlled according to the contents of the picture pattern of a print under inspection.

In the following embodiment, masking and changing the decision level are carried out by the same means. Desired portion of the picture pattern are selectively masked, and decision levels different according to the contents of a picture pattern are set up as desired. In order that the arrangement is simplified and the inspection is performed without lowering the yielding of prints with the picture pattern being maintained high in quality, the picture element control data memory having addresses corresponding to those in the reference data memory is provided, and in the inspecting operation by comparison of inspection data with reference data the decision level is set for each picture element according to the data which are read out of the picture element control data memory.

Figure 37:
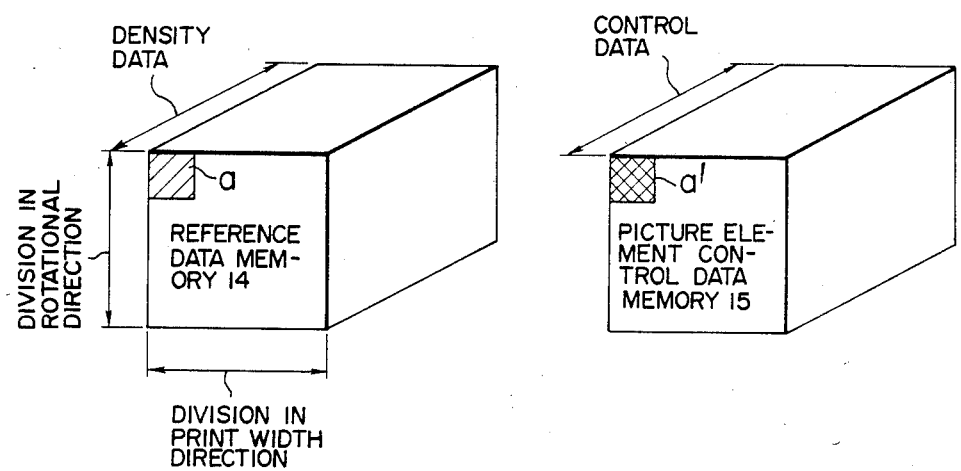
FIG. 37 is a diagram outlining a picture element control data memory.

Similarly as in the case of the reference data memory 14 described with reference to FIG. 2, the picture element control data memory 15 has the same memory contents as the reference data memory 14 as shown in FIG. 37. Furthermore, similarly the memory 15 is so designed that control data corresponding to the addresses a in the reference data memory 14 are written in and read out of the addresses a' which are arranged in the direction of width of a print and in the direction of run.

Figure 38:
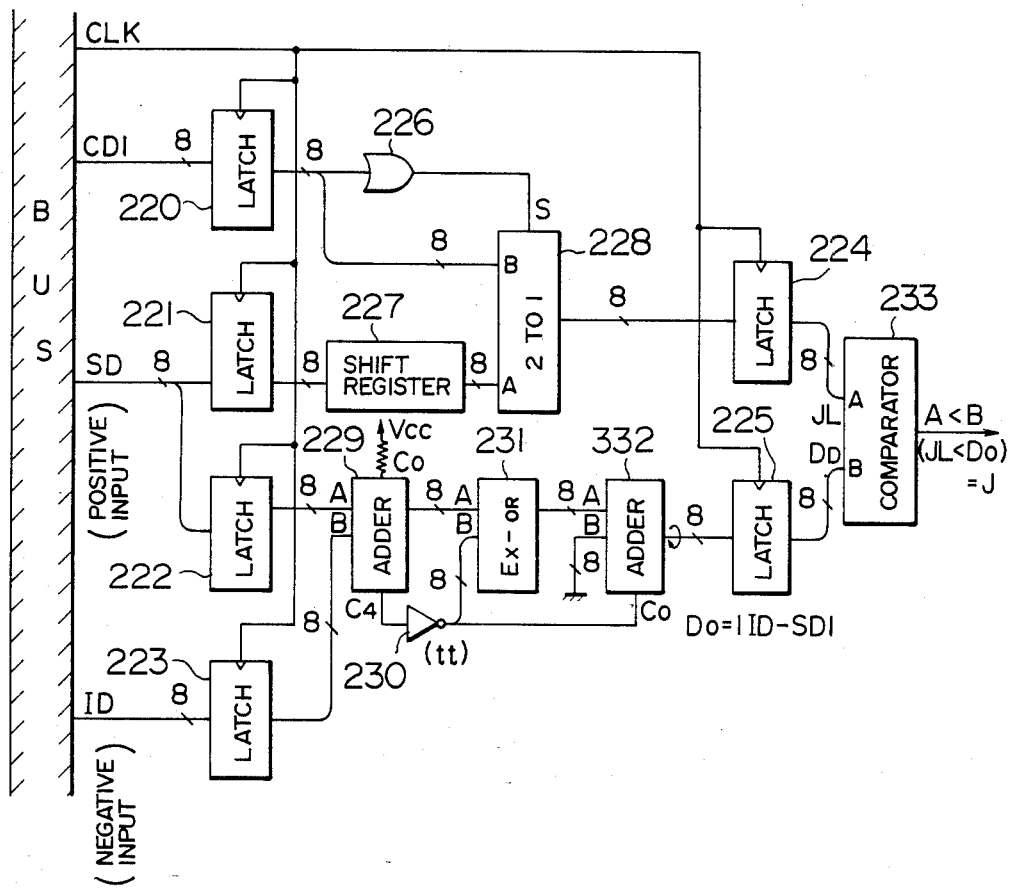
FIG. 38 is a circuit diagram showing another example of the first feature extraction comparison decision circuit.

FIG. 38 shows one example of the first feature extraction comparison decision circuit 9 in the embodiment. When the inspection is started after the printing operation has been started, the inspection data ID, and the data SD and the data CD1 from the reference data memory 14 and the picture element control data memory 15 are successively read for the same addresses and are loaded in latch circuits 220 through 223.

The reference data SD in positive state which is applied to the latch circuit 222 and the detection data ID in negative state which is applied to the latch circuit 223 are processed by a circuit comprising an addition circuit 229, an inverter 230, an EXCLUSIVE OR gate 231 and an addition circuit 232, as a result of which data $D_D$ representing the absolute value of the difference between the inspection data ID and the reference data SD is provided and is then written in a latch circuit 225, i.e., $D_D = |ID - SD|$ is obtained. The data $D_D$ is applied to one input B of a comparator 223 by the latch circuit 225.

The reference data SD from the latch 221 is applied to a shift register 227, where it is shifted as much as a predetermined number of bits. As a result, the data SD is multiplied by a predetermined coefficient K (smaller than one); that is, data KSD is applied to one input B of a selection circuit 228.

On the other hand, the control data CD1, which has been loaded in the latch circuit 220, is read out as it is and is applied to the other input B of the selection circuit 228. The control data CD1 is further applied through an OR gate 226 to the selection input S of the selection circuit 228. The selection circuit 228 operates to output the data applied to the input B when the selection input S is at the "H" level and the data applied to the input A when the selection input S is at the "L" level.

In the comparator 223, data JL at the input A is compared with the data $D_D$ at the input B. Only when the data $D_D$ at the input B is larger than the data at the input A, the comparator produces an "H" level output J. That is, the comparison is carried out with the data JL as a decision level, to provide the output J.

Accordingly, the computer 21 monitors the output J of the comparator 233. More specifically, the computer 21 determines that, when the output J is at the "L" level, the picture pattern portion corresponding to the address of the memories 14 and 15 has no defect, and determines that, when the output J is at the "H" level, it has a defect, to perform the predetermined operation.

It is assumed that the control data written in an address in the picture control data memory 15 is $(O,O)_H$, i.e., all eight bits are "O".

When the inspection data of the picture pattern portion corresponding to the address is read out and the inspection is going to be performed, the output of the OR gate 226 is set to the "L" level, and therefore the selection circuit 228 writes the data KSD at the input A in the latch circuit 224.

As a result, the data JL representing the decision level of the comparator 233 is the data KSD which is obtained by shifting the reference data SD in the shift register 227, i.e., by multiplying the data SD by the coefficient K. With the data KSD, it is determined whether or not the picture pattern is acceptable. In this case, the picture pattern is inspected according to the system in which the decision level changes as the function of the reference data as described with reference to FIG. 34.

Accordingly, if the data $(O,O)_H$ is written in an optional address in the picture element control data memory 15, then the picture pattern portion corresponding to the address is inspected according to the system in which the decision level changes as the function of the reference data. In this connection, it goes without saying that the addressing may be effected for each group of picture elements instead of each picture element.

It is assumed that the control data written in an address in the picture element control data memory 15 is other than $(O,O)_H$, i.e., at least one of the eight bits is "1".

In this case, the output of the OR gate 226 is raised to the "H" level when the inspection data of a picture pattern portion corresponding to this address is read out. Therefore, the selection circuit 228 supplies the data CD1 at its input B to the latch circuit 224, as it is.

Accordingly, in this case, the comparator 223 operates with the control data CD1 read out of the address as the decision level. Therefore, with the control data written in the picture element control data memory 15, different decision levels can be provided for different addresses of a picture pattern in the inspection thereof.

Figure 36:
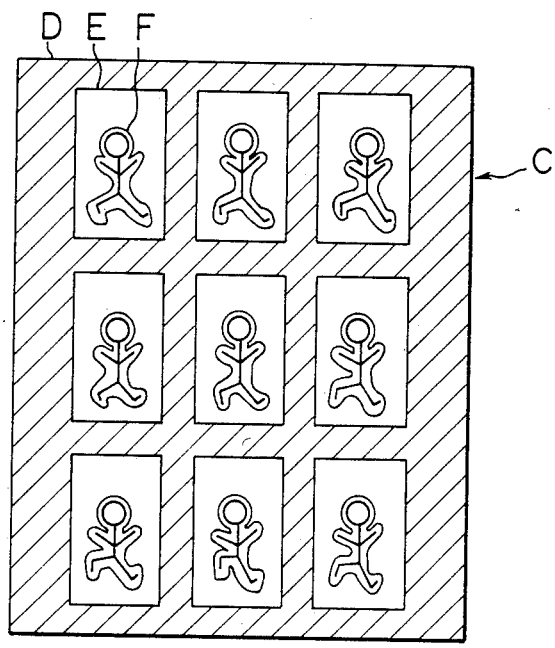

For instance, as shown in FIG. 36, a picture pattern C on a print to be inspection has a portion D such as a margin for which no inspection is required. For such a portion D, the control data to be written in the address is made sufficiently large, whereby the decision level is set high for the portion and the presence or absence of slight defects is neglected. For an essential portion E, the control data to be written in the address is made small and the decision level is set low, so that the portion E is strictly inspected. For a more essential portion F, the decision level is set lower. Thus, control is performed finely for the provision of satisfactory prints.

If, in this connection, the control data $(F,F)_H$ is written in the address in the picture element control data memory 15 which corresponds to the portion B in FIG. 35 or the portion D in FIG. 36, then for this portion the output J of the comparator 233 is set to "L" at all times irrespective of the data $D_D$. Therefore, the same result as that in the case where no inspection is carried out for picture pattern defects is obtained; that is, masking operation is effected for optional picture pattern portions.

A control data writing method for the picture element control data memory 15 will be described.

As is apparent from FIG. 3, in the embodiment, all the operations are controlled by the computer 21, and writing control data in the picture element control data memory 15 is also controlled by the computer 21.

The writing operation will be concretely described.

Figure 39:
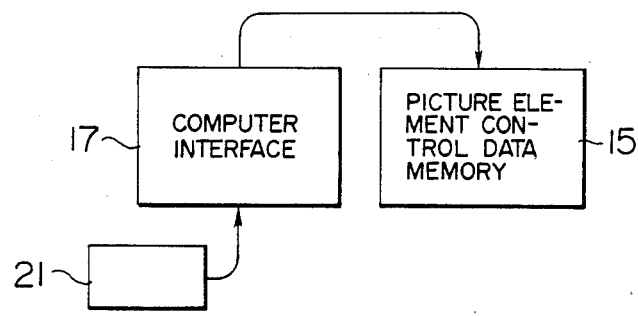
FIGS. 39 and 40 are explanatory diagrams showing examples of the operation of setting data in the picture element control data memory.

(1) When an optional value is set, as a decision level, in the picture element control data memory 15:

As shown in FIG. 39, decision level data having optional values are successively applied to the picture element control data memory 15, so as to be written and set therein.

Figure 40:
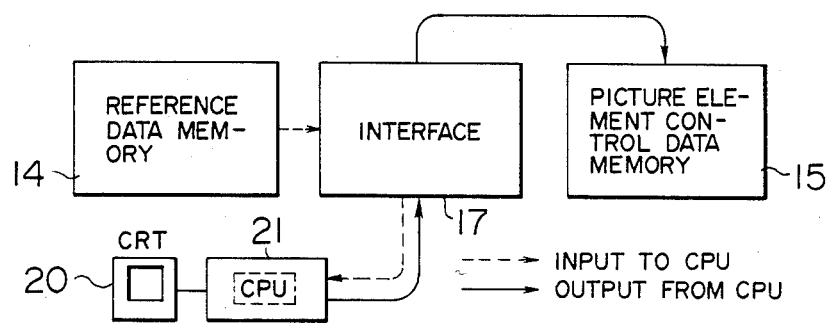

(2) When data obtained by multiplying the reference data by a ratio K (K<1) is set, as a decision level, in the picture element control data memory 15:

As shown in FIG. 40, the content of the reference data memory 14 is loaded through the computer interface 17 into the CPU of the computer 21. Thereafter, in the CPU, the content is multiplied by a ratio K (K<1) for every picture element of the reference data, to obtain data representing a decision level. In this case, in a low density level region (small in digital value) multiplication of the ratio K may result in "O". Therefore, a minimum value which can be set should be predetermined, or a certain value should be added to the product of the reference data and the ratio K.

The data thus provided to represent decision levels for the picture elements are set in the picture element control data memory 15 through the computer interface 17. It goes without saying that a hardware arrangement may be employed for setting such data.

(3) When the reference data is monitored, and the position of an optional portion of the picture pattern is determined with a cursor or the like, so that a decision level is set in the picture element control data memory 15 for every optional portion:

As shown in FIG. 40, the content of the reference data memory 14 is loaded into the CPU through the computer interface 17 and inputted to the CRT, so that it can be monitored as an image. A portion of the picture pattern reproduced is specified by moving the cursor and the position of the portion is loaded into the CPU, so that an optional decision level at that position is set in the picture element control data memory 15 through the computer interface 17 by the CPU.

(4) When the contour portion of a picture pattern is extracted out of the reference data, and a special decision level provided for that portion is set in the control data memory:

As shown in FIG. 40, the content of the reference data memory 14 is loaded through the computer interface 17 into the CPU, and a digital image processing operation is carried out in order to extract the picture pattern contour portion out of the data. An optional decision level is determined for the address of the contour portion thus extracted, and the data is set in the picture element control data memory 15 through the computer interface 17.

A method of extracting components representing a contour portion in a longitudinal or lateral direction out of the picture pattern of such image data is according to a spatial filtering technique which is generally employed in digital image processing. By this method, the object can be readily achieved.

If the densities of points in a 3×3 square region with an optional point fij of a picture pattern as the center are employed, a spatial filter used for extracting a contour in the longitudinal direction is:

$$\begin{bmatrix} 1 & 0 & -1 \\ 1 & 0 & -1 \\ 1 & 0 & -1 \end{bmatrix} \text{ or } \begin{bmatrix} -1 & 0 & 1 \\ -1 & 0 & 1 \\ -1 & 0 & 1 \end{bmatrix}$$

and a spatial filter used for extracting a contour in the lateral direction is:

$$\begin{bmatrix} 1 & 1 & 1 \\ 0 & 0 & 0 \\ -1 & -1 & -1 \end{bmatrix} \text{ or } \begin{bmatrix} -1 & -1 & -1 \\ 0 & 0 & 0 \\ 1 & 1 & 1 \end{bmatrix}$$

In the case where the contour of a picture pattern is merely obtained, the spatial filter in a method of obtaining differences in four directions according to the Laplacian process is:

$$\begin{bmatrix} 0 & -1 & 0 \\ -1 & 4 & -1 \\ 0 & -1 & 0 \end{bmatrix}$$

and the spatial filter in a method of obtaining differences in eight directions is:

$$\begin{bmatrix} -1 & -1 & -1 \\ -1 & 8 & -1 \\ -1 & -1 & -1 \end{bmatrix}$$

In the case of paragraph (4), the contour portion of a picture pattern is extracted and the special decision level is provided. This is due to the following reason: For the portion of a picture pattern, in which the density changes abruptly, the detecting operation is greatly affected by the position shift which may occur in detecting defects. That is, because of the position shift the detecting operation is carried out as if defects were involved, although no defects are included; i.e., the detection is liable to become erroneous. In order to overcome this difficulty, the contour portion of the picture pattern is detected, and the decision level for this portion only is made higher than those for other portions. In this case, the possibility of erroneous operation due to the position shift can be reduced without increasing the decision level as a whole so much.

In the inspection as described above, in order to detect defects such as doctor stripes in the direction of rotation which may occur in gravure printing, the longitudinal length of one picture element detection area should be larger than the lateral length as shown in the parts (A) and (B) of FIG. 41. Even when, in this case, the position is shifted by the same distance ($\Delta X$ or $\Delta Y$), one picture element photoelectric element detection area is affected more greatly by the position shift in the lateral direction X than by the position shift in the longitudinal direction Y, as is apparent from the parts (A) and (B) of FIG. 42.

Accordingly, if the above-described method, in which the contour portion is detected, and for the portion the decision level in the lateral direction is made higher than the decision level in the longitudinal direction, is employed, the frequency of erroneous operation due to the position shift is reduced, and the possibility of increasing the frequency of erroneous operation can be eliminated without lowering the defect detecting accuracy as a whole.

It is unnecessary to individually conduct the control data setting operations described in paragraphs (1) through (4) above. That is, they may be conducted in association with other setting methods in software and hardware senses, by taking the reduction of data setting time and the manufacture of hardware into consideration.

One example of the data setting method in such a case is as indicated by a flow chart in FIG. 43.

In the block diagram of FIG. 3, the buffer memory 16 is provided for transmitting and receiving the data which are necessary for the operation of the computer 21, and the monitoring address generating circuit 18 and the monitor interface 19 are provided for applying the internal digital data to the monitor 20. The computer 21 is, for instance, a personal computer. It goes without saying that the computer 21 is provided to control all the operations of the inspecting apparatus.

In the above-described embodiment, the inspecting position is on the printing cylinder; however, it goes without saying that the technical concept of the invention is applicable to off-line inspection and sheet-prints inspection, if the arrangement is so modified as to detect the absolute position of the picture pattern.

INDUSTRIAL APPLICABILITY

As was described above, according to the invention, the apparatus can be provided which, even when prints are run at considerably high speed as in the case of a rotary press, can inspect the prints in real time and with high accuracy.

Accordingly, only the prints which are satisfactory in finish can be picked up, while the prints which are unsatisfactory can be positively discarded.

What is claimed is:

1. A method of inspecting prints comprising the steps of:
writing reference data from a reference print in a reference data memory;
comparing image data obtained from a running print under inspection with said reference data for every printing element; and determining whether or not said print is acceptable through said comparison of two data; characterized by:

loading print running speed data while loading said reference data;

comparing said print running speed data loaded during loading said reference data with print speed data loaded during said image data obtained from a print under inspection; and rewriting said reference data when the difference between said two speed data exceeds a predetermined value.

2. A method according to claim 1 wherein said method further comprises the steps of:

reducing an image of said reference data read out of said reference data memory;

specifying an optional portion of said image; and enabling to write data in the corresponding address in a control data memory.

3. A method as claimed in claim 1, wherein said method further comprises the steps of:

recognizing said control data read out of said control data memory;

arithmetic processing said reference data read out of said reference data memory; and selecting said decision level in comparison of said inspection data with said reference data by switching output data obtained by said arithmetic processing and said control data read out of said control data memory.

4. A method as claimed in claim 1, wherein said method further comprises the steps of:

determining the level of control data read out of said control data memory; and setting the decision level in the comparison of said detection data with reference data to a sufficiently high value when the level of said control data is higher than a predetermined value.

5. A method as claimed in claim 1, wherein said method further comprises the steps of:

reproducing an image of said reference data read out of said reference data memory;

specifying an optional portion of said image and;

enabling to write data in the corresponding address in said control data memory.

6. A method claimed in claim 1, wherein said method further comprises the steps of:

extracting the contour portion of an image according to said reference data read out of said reference data memory; and writing data in the corresponding address in said control data memory.

7. A print inspecting apparatus of the type that a memory capable of storing image data read out of one picture pattern on a running print is provided, image data read out of said memory employed as reference data while image data read out of the remaining picture patterns is employed as inspection data, and said reference data and inspection data are subjected to comparison to determine whether or not said print is acceptable, characterized by comprising:

a control data memory having addresses which are provided for every printing element of image data; and a data setting means for writing control data for determining an allowable difference of said inspection data with reference to said reference data in said control data memory for every printing element of said image data, so that a decision for at least one of the reference and inspection data comparison operations by a first, second and third comparison means is set up according to control data read out of said control memory; said data setting means comprising:

monitor means for reproducing on an image display surface said reference data read out of said reference data memory, and means for specifying an optional portion of said image display surface of said monitor means, so as to write in a corresponding address in said control data memory.

* * * * *